(12) United States Patent
Wang et al.

(10) Patent No.: US 12,171,005 B2
(45) Date of Patent: Dec. 17, 2024

(54) SIDELINK BUFFER STATUS REPORT FOR MULTIPLE DESTINATION DEVICES

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 17/647,882

(22) Filed: Jan. 13, 2022

(65) Prior Publication Data

US 2023/0224903 A1 Jul. 13, 2023

(51) Int. Cl.
*H04W 72/21* (2023.01)
*H04W 72/121* (2023.01)
*H04W 72/23* (2023.01)
*H04W 92/18* (2009.01)

(52) U.S. Cl.
CPC ......... *H04W 72/21* (2023.01); *H04W 72/121* (2013.01); *H04W 72/23* (2023.01); *H04W 92/18* (2013.01)

(58) Field of Classification Search
CPC ... H04W 72/21; H04W 72/121; H04W 72/23; H04W 92/18; H04W 72/25; H04W 76/15; H04W 72/20; H04W 72/40; H04W 52/383; H04W 4/38; H04W 4/40; H04W 4/44; H04W 4/46; H04W 72/115; H04W 88/02; H04W 76/14; H04W 76/10; H04W 76/00; H04W 76/11; H04W 74/00; H04W 72/00; H04W 72/02; H04W 72/04; H04W 36/02; H04W 36/023; H04W 88/00; H04W 88/08; H04W 4/06; H04W 76/40; H04W 76/009;
(Continued)

(56) References Cited

U.S. PATENT DOCUMENTS 9,060,293 B1 * 6/2015 Vivanco et al. .. H04W 28/0231
11,844,085 B2 * 12/2023 Fakoorian et al. ... H04W 72/23
2017/0118671 A1 * 4/2017 Lee et al. .......... H04W 28/0278
(Continued)

FOREIGN PATENT DOCUMENTS

GB 2617965 A * 10/2023 ............. H04B 7/155
WO WO 2017039513 A1 * 3/2017
(Continued)

OTHER PUBLICATIONS (WO 2013182035 A1) >>> Buffer State Reporting Method, System, and Device (see title) (Year: 2013).*
(Continued)

*Primary Examiner* — Meless N Zewdu
(74) *Attorney, Agent, or Firm* — QUALCOMM Incorporated

(57) ABSTRACT

Various aspects of the present disclosure generally relate to wireless communication. In some aspects, a user equipment (UE) may receive, from each of multiple devices that
(Continued)

communicate with the UE via one or more sidelink channels, information indicating a buffer status of the device. The UE may transmit, to a base station, a buffer status report that indicates a combined sidelink buffer status for the multiple devices. Numerous other aspects are described.

30 Claims, 18 Drawing Sheets

(58) Field of Classification Search
CPC .............. H04W 72/12; H04W 72/1268; H04B 7/06954; G06Q 20/08; G06Q 20/32
See application file for complete search history.

(56) References Cited

U.S. PATENT DOCUMENTS

| | | | |
|---|---|---|---|
| 2018/0049196 A1* | 2/2018 | Gupta et al. ...... | H04W 72/0453 |
| 2018/0234524 A1* | 8/2018 | Cheng et al. ........... | H04L 69/22 |
| 2020/0196353 A1* | 6/2020 | Zhang et al. ..... | H04W 74/0816 |
| 2021/0219169 A1* | 7/2021 | Ji ..................... | H04W 28/0278 |
| 2021/0227465 A1* | 7/2021 | Kung et al. ........ | H04W 52/0216 |
| 2021/0352682 A1* | 11/2021 | Zheng et al. ..... | H04W 72/1231 |
| 2022/0006576 A1* | 1/2022 | Fong et al. ........... | H04L 1/1896 |
| 2022/0030519 A1* | 1/2022 | Zhou et al. ........ | H04W 52/0235 |
| 2022/0045798 A1* | 2/2022 | Tang et al. ............ | H04L 1/1812 |
| 2022/0330223 A1* | 10/2022 | Xue et al. ........... | H04W 72/048 |
| 2023/0080625 A1* | 3/2023 | Dutta et al. ........... | H04W 72/02 |
| 2023/0101476 A1* | 3/2023 | Ryu et al. ............. | H04W 72/02 |
| 2023/0117480 A1* | 4/2023 | Balasurbramanian et al. ............. H04W 52/0229 |
| 2023/0217304 A1* | 7/2023 | Singh et al. ...... | H04W 28/0278 |
| 2023/0309161 A1* | 9/2023 | Rao et al. ............. | H04W 76/14 |

FOREIGN PATENT DOCUMENTS

| | | | | |
|---|---|---|---|---|
| WO | WO 2018084796 A1 * | 5/2018 | ............. | H04W 72/04 |
| WO | WO 2021067583 A2 * | 4/2021 | ............... | H04L 5/00 |
| WO | WO 2021255107 A1 * | 12/2021 | ............ | H04W 72/12 |
| WO | WO 2022139152 A1 * | 6/2022 | ............ | H04W 28/02 |

OTHER PUBLICATIONS (WO 2022153855 A1) >>> Wireless Communication Device, Base Station, Communication System, and Communication Method (see title) (Year: 2022).*

(WO 2022126459 A1) >>> Method and Apparatus for Determining Transmission Resource, and Communication Device and Storage Medium (see title) (Year: 2022).*

(KR 20210150429 A) >>> Different Direct Link-based SL BSR Control Method And Apparatus In Sidelink Communication System (see title) (Year: 2021).*

(KR 2023021516 A) >>> Method For Operating A Terminal In E.g. Long Term Evolution System, For Reporting Terminal Capability, Involves Setting UE Capability Parameter By Comparing Buffer Size With Memory Size, And Reporting Capability Information To Base Station (Year: 2023).*

Liu, Jinhua (WO 2022083573 A1) >>> Preemptive BSR Configuration Method and Apparatus, and Electronic Device (see title) (Year: 2022).*

* cited by examiner

SIDELINK BUFFER STATUS REPORT FOR MULTIPLE DESTINATION DEVICES

FIELD OF THE DISCLOSURE

Aspects of the present disclosure generally relate to wireless communication and to techniques and apparatuses for using a sidelink buffer status report for multiple destination devices.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
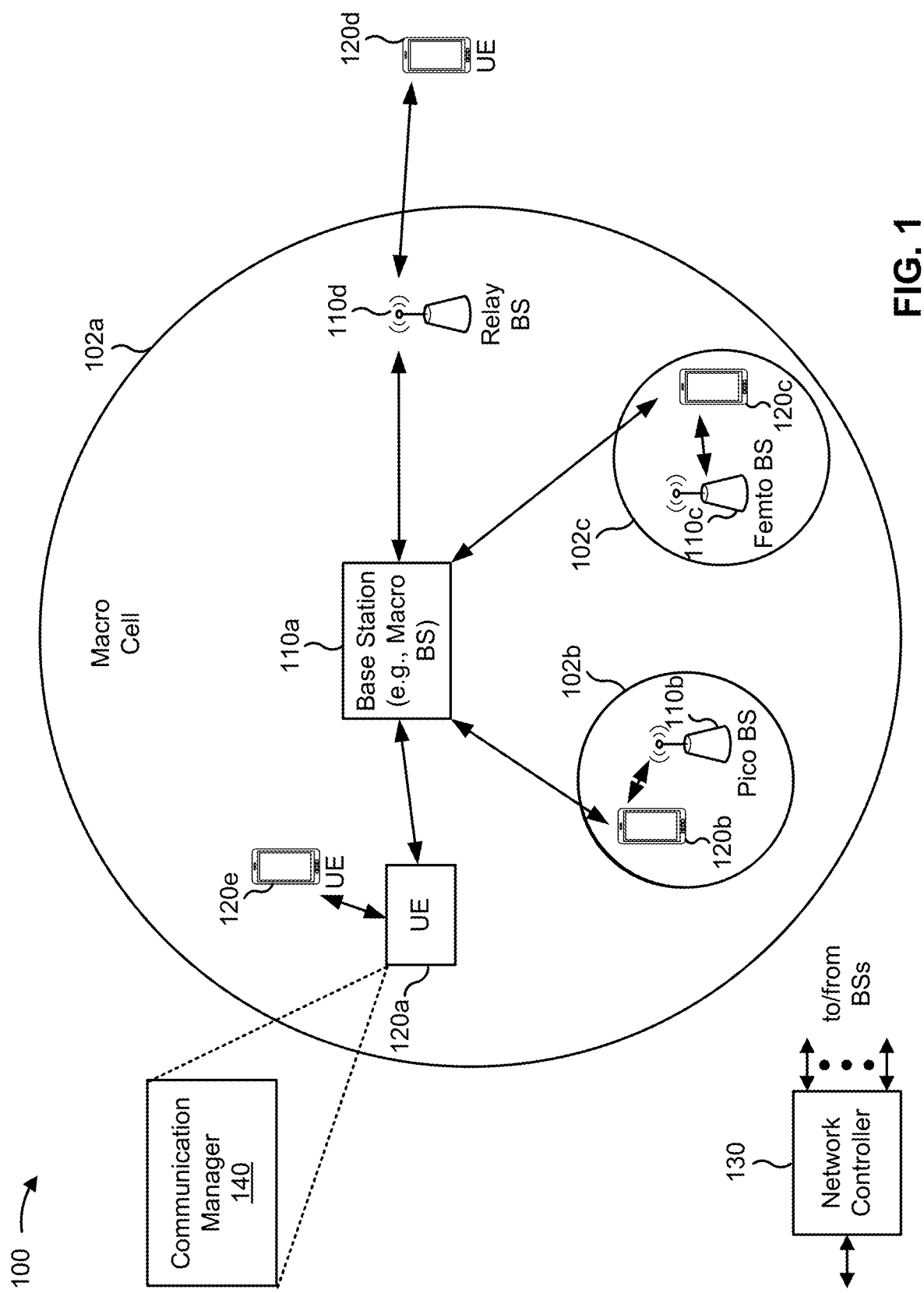
FIG. 1 is a diagram illustrating an example of a wireless network, in accordance with the present disclosure.

Some aspects described herein relate to a method of wireless communication performed by a user equipment (UE). The method may include receiving, from each of multiple devices that communicate with the UE via one or more sidelink channels, information indicating a buffer status of the device. The method may include transmitting, to a base station, a buffer status report (BSR) that indicates a combined sidelink buffer status for the multiple devices.

Some aspects described herein relate to a method of wireless communication performed by a base station. The method may include receiving, from a UE, a BSR that indicates a combined sidelink buffer status for multiple devices that communicate with the UE via a sidelink channel. The method may include transmitting, to the UE, a grant of resources that the UE is to distribute to the multiple devices, based at least in part on the BSR.

Some aspects described herein relate to a method of wireless communication performed by a wireless device.

The method may include generating information indicating a buffer status of the wireless device. The method may include transmitting the information to a UE via a sidelink channel.

Some aspects described herein relate to a method of wireless communication performed by a UE. The method may include receiving, from each of multiple devices that communicate with the UE via sidelink, information indicating a buffer status of the device. The method may include transmitting, to a base station, a request for resources that is based at least in part on a combined sidelink buffer status for the multiple devices.

Some aspects described herein relate to a UE for wireless communication. The UE may include a memory and one or more processors coupled to the memory. The one or more processors may be configured to receive, from each of multiple devices that communicate with the UE via one or more sidelink channels, information indicating a buffer status of the device. The one or more processors may be configured to transmit, to a base station, a BSR that indicates a combined sidelink buffer status for the multiple devices.

Some aspects described herein relate to a base station for wireless communication. The base station may include a memory and one or more processors coupled to the memory. The one or more processors may be configured to receive, from a UE, a BSR that indicates a combined sidelink buffer status for multiple devices that communicate with the UE via a sidelink channel. The one or more processors may be configured to transmit, to the UE, a grant of resources that the UE is to distribute to the multiple devices, based at least in part on the BSR.

Some aspects described herein relate to a wireless device for wireless communication. The wireless device may include a memory and one or more processors coupled to the memory. The one or more processors may be configured to generate information indicating a buffer status of the device. The one or more processors may be configured to transmit the information to a UE via a sidelink channel.

Some aspects described herein relate to a UE for wireless communication. The UE may include a memory and one or more processors coupled to the memory. The one or more processors may be configured to receive, from each of multiple devices that communicate with the UE via sidelink, information indicating a buffer status of the device. The one or more processors may be configured to transmit, to a base station, a request for resources that is based at least in part on a combined sidelink buffer status for the multiple devices.

Some aspects described herein relate to a non-transitory computer-readable medium that stores a set of instructions for wireless communication by a UE. The set of instructions, when executed by one or more processors of the UE, may cause the UE to receive, from each of multiple devices that communicate with the UE via one or more sidelink channels, information indicating a buffer status of the device. The set of instructions, when executed by one or more processors of the UE, may cause the UE to transmit, to a base station, a BSR that indicates a combined sidelink buffer status for the multiple devices.

Some aspects described herein relate to a non-transitory computer-readable medium that stores a set of instructions for wireless communication by a base station. The set of instructions, when executed by one or more processors of the base station, may cause the base station to receive, from a UE, a BSR that indicates a combined sidelink buffer status for multiple devices that communicate with the UE via a sidelink channel. The set of instructions, when executed by one or more processors of the base station to transmit, to the UE, a grant of resources that the UE is to distribute to the multiple devices, based at least in part on the BSR.

Some aspects described herein relate to a non-transitory computer-readable medium that stores a set of instructions for wireless communication by a wireless device. The set of instructions, when executed by one or more processors of the wireless device, may cause the wireless device to generate information indicating a buffer status of the wireless device. The set of instructions, when executed by one or more processors of the wireless device, may cause the wireless device to transmit the information to a UE via a sidelink channel.

Some aspects described herein relate to a non-transitory computer-readable medium that stores a set of instructions for wireless communication by a UE. The set of instructions, when executed by one or more processors of the UE, may cause the UE to receive, from each of multiple devices that communicate with the UE via sidelink, information indicating a buffer status of the device. The set of instructions, when executed by one or more processors of the UE, may cause the UE to transmit, to a base station, a request for resources that is based at least in part on a combined sidelink buffer status for the multiple devices.

Some aspects described herein relate to an apparatus for wireless communication. The apparatus may include means for receiving, from each of multiple devices that communicate with the apparatus via one or more sidelink channels, information indicating a buffer status of the device. The apparatus may include means for transmitting, to a base station, a BSR that indicates a combined sidelink buffer status for the multiple devices.

Some aspects described herein relate to an apparatus for wireless communication. The apparatus may include means for receiving, from a UE, a BSR that indicates a combined sidelink buffer status for multiple devices that communicate with the UE via a sidelink channel. The apparatus may include means for transmitting, to the UE, a grant of resources that the UE is to distribute to the multiple devices, based at least in part on the BSR.

Some aspects described herein relate to an apparatus for wireless communication. The apparatus may include means for generating information indicating a buffer status of the apparatus. The apparatus may include means for transmitting the information to a UE via a sidelink channel.

Some aspects described herein relate to an apparatus for wireless communication. The apparatus may include means for receiving, from each of multiple devices that communicate with the apparatus via sidelink, information indicating a buffer status of the device. The apparatus may include means for transmitting, to a base station, a request for resources that is based at least in part on a combined sidelink buffer status for the multiple devices.

Aspects generally include a method, apparatus, system, computer program product, non-transitory computer-readable medium, UE, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a programmable logic controller (PLC), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from each of multiple devices that communicate with the UE via one or more sidelink channels, information indicating a buffer status of the device. The buffer status may include an amount of data in a buffer that is to be transmitted, and the buffer status information may include an indication of that amount. The buffer status information may include an indication of a maximum size of the buffer. The communication manager 140 may transmit, to a base station, a buffer status report (BSR) that indicates a combined sidelink buffer status for the multiple devices.

In some aspects, a wireless device (that includes components of a UE 120) may include a communication manager 140. As described in more detail elsewhere herein, the communication manager 140 may generate information indicating a buffer status of the wireless device and transmit the information to a UE via a sidelink channel.

In some aspects, the communication manager 140 may receive, from each of multiple devices that communicate with the UE via sidelink, information indicating a buffer status of the device. The communication manager 140 may transmit, to a base station, a request for resources that is based at least in part on a combined sidelink buffer status for the multiple devices. Additionally, or alternatively, the communication manager 140 may perform one or more other operations described herein.

In some aspects, the base station 110 may include a communication manager 150. As described in more detail elsewhere herein, the communication manager 150 may receive, from a UE, a BSR that indicates a combined sidelink buffer status for multiple devices that communicate with the UE via a sidelink channel. The communication manager 150 may transmit, to the UE, a grant of resources that the UE is to distribute to the multiple devices, based at least in part on the BSR. Additionally, or alternatively, the communication manager 150 may perform one or more other operations described herein.

As indicated above, FIG. 1 is provided as an example. Other examples may differ from what is described with regard to FIG. 1.

Figure 2:
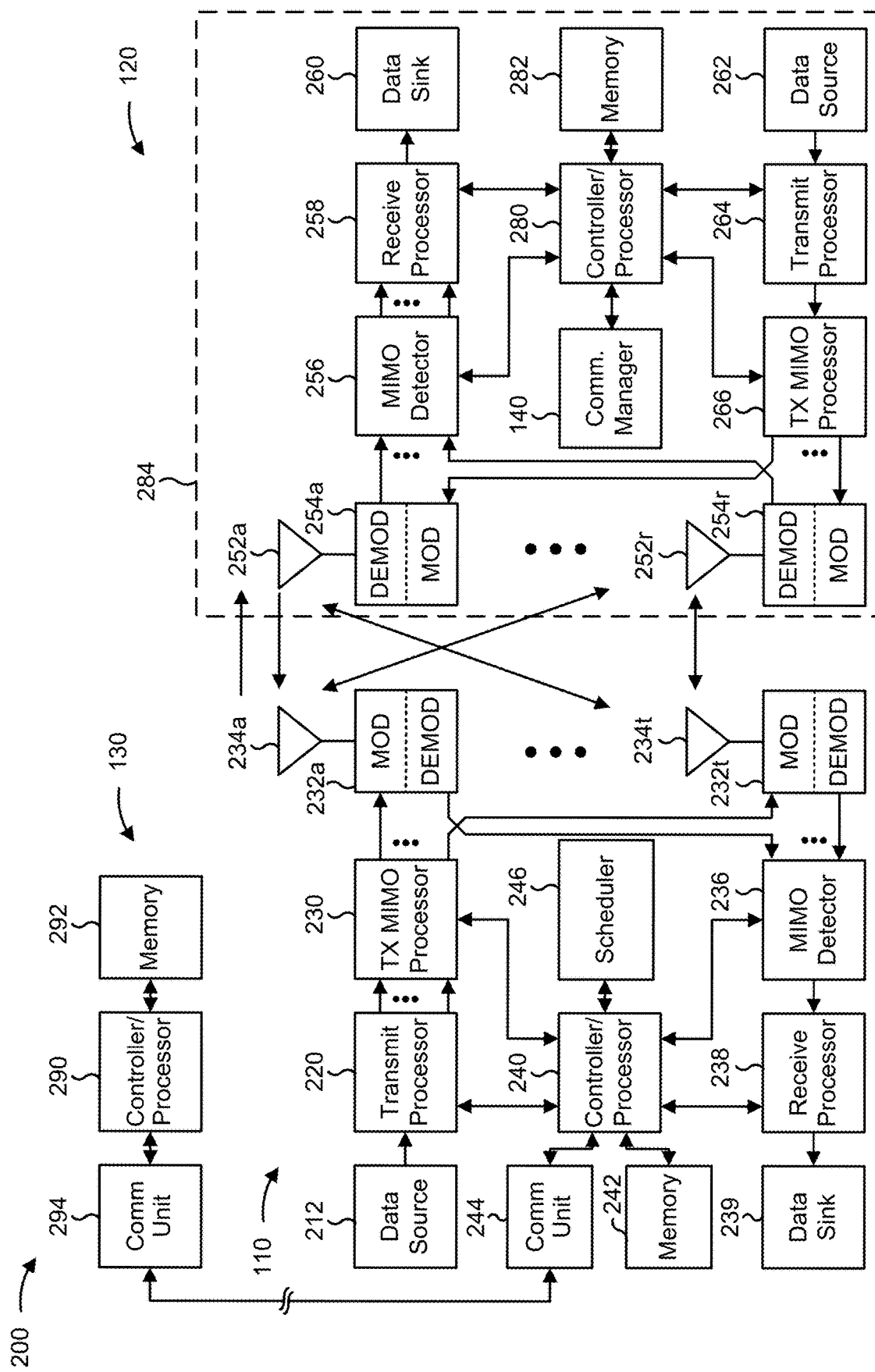
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM) and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-18).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-18).

The controller/processor 240 of the base station 110, the controller/processor 280 of the UE 120, and/or any other component(s) of FIG. 2 may perform one or more techniques associated with sidelink BSRs for multiple destination devices, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, process 1400 of FIG. 14, process 1500 of FIG. 15, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, the UE 120 includes means for receiving, from each of multiple devices that communicate with the UE via one or more sidelink channels, information indicating a buffer status of the device; and/or means for transmitting, to a base station, a BSR that indicates a combined sidelink buffer status for the multiple devices. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from a UE, a BSR that indicates a combined sidelink buffer status for multiple devices that communicate with the UE via a sidelink channel; and/or means for transmitting, to the UE, a grant of resources that the UE is to distribute to the multiple devices, based at least in part on the BSR. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a wireless device includes means for generating information indicating a buffer status of the wireless device; and/or means for transmitting the information to a UE via a sidelink channel. In some aspects, the means for the wireless device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving, from each of multiple devices that communicate with the UE via sidelink, information indicating a buffer status of the device; and/or means for transmitting, to a base station, a request for resources that is based at least in part on a combined sidelink buffer status for the multiple devices.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
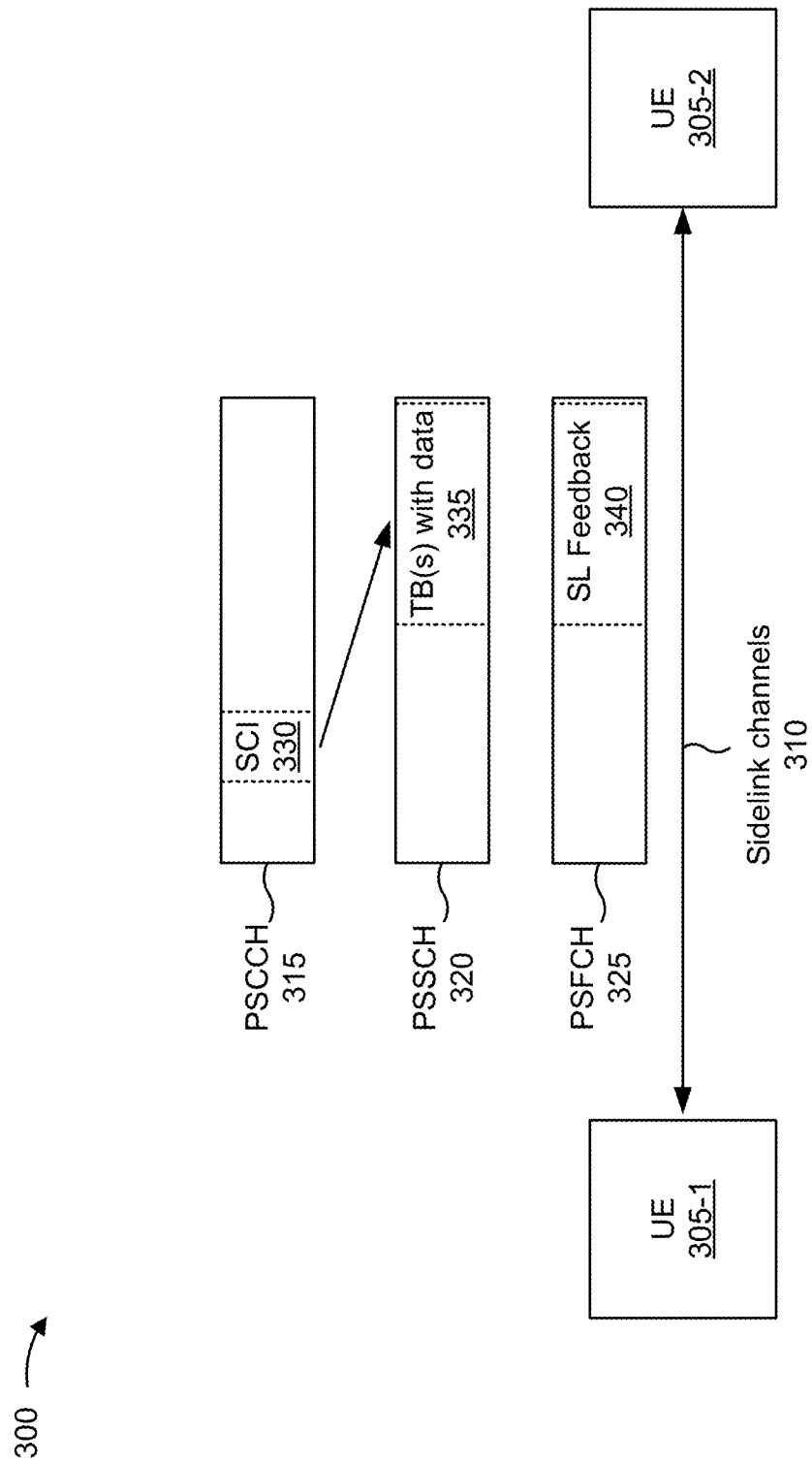
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process identifier (ID), a new data indicator (NDI), a source identifier, a destination identifier, and/or a channel state information (CSI) report trigger.

For SCI format SCI_0 in PSCCH, a frequency domain resource allocation (FDRA) may be $$\left\lceil \log \frac{N^{SL}_{subchannel}(N^{SL}_{subchannel}+1)}{2} \right\rceil$$

bits for 2 reservations, or $$\left\lceil \log \frac{N^{SL}_{subchannel}(N^{SL}_{subchannel}+1)(2N^{SL}_{subchannel}+1)}{6} \right\rceil$$

bits for 3 reservations. A time domain resource allocation (TDRA) may be 5 bits for 2 reservations or 9 bits for 3 reservations. A PSCCH may occupy {10, 12, 15, 20, 25} physical resource blocks (PRBs) and be limited to a single sub-channel. The PSCCH duration may be 2 or 3 symbols. A subchannel may occupy {10, 15, 20, 25, 50, 75, 100} PRBs. The quantity of sidelink subchannels N may be 1-27 in a resource pool, and the PSCCH size may be fixed for a resource pool (e.g., 10% to 100% of one subchannel (first 2 or 3 symbols), depending on configuration). The PSSCH may occupy at least one subchannel and contain second stage SCI.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. The format of the DCI for Mode 1 may be DCI 3_0 for sidelink transmission. DCI 3_0 may allocate time and frequency resources and indicate transmission timing. DCI 3_0 content may include a resource pool index with bits that depend on a quantity of resource pools in sl-TxPoolScheduling. DCI 3_0 content may also include a time gap indicated by 3 bits in sl-DCI-ToSL-Trans. DCI 3_0 content may also include a HARQ process number (4 bits), an NDI (1 bit), a lowest subcarrier index for allocation, SCI-1-A format fields (time domain resource allocation, frequency domain resource allocation), PSFCH to HARQ feedback timing indicated by sl-PSFCH-ToPUCCH, a PUCCH resource indicator (3 bits), a configuration index (0 bits if dynamic grant only, 3 bits otherwise), a service area identifier (2 bits), and/or padding bits.

In some aspects, the UE 305 may transmit a sidelink BSR to help the base station 110 with its scheduling decisions. In the BSR, UE 305 may report the buffer size (e.g., the amount of data waiting for transmission) for each logical channel to a destination UE. All data, up to packet data convergence protocol (PDCP) service data units (SDUs) for which no PDCP data protocol data units (PDUs) have been constructed, may be considered for the BSR. The BSR may be for a logical channel group and include multiple buffer sizes. For example, each logical channel in the BSR may correspond to a logical channel ID, a destination index for a receiving destination UE, and a buffer size for the destination UE. The destination index may be indicated by 5 bits and point to the first 32 entries of a destination UE list reported to the bae station via an RRC message. The base station 110 may provide a sidelink resource allocation via DCI to the UE based on the BSR. However, the base station 110 may not specify the destination UE in the DCI.

In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a specified set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

To receive a sidelink packet, a receiving sidelink UE may perform blind decoding on all sidelink subchannels. The quantity of subchannels may be small (e.g., 1-27 subchannels) such that blind decoding on all subchannels is still feasible. A transmitting sidelink UE may transmit a PSCCH communication and a PSSCH communication within a same slot. The PSSCH communication may occupy up to $N_{subchannel}^{SL}$ contiguous subchannels. The PSCCH communication may occupy up to one subchannel with the lowest subchannel index. The transmitting sidelink UE may transmit a first stage SCI in the PSCCH communication with information about the PSSCH bandwidth and resource reservations in future slots. The receiving sidelink UE may receive and decode a second stage SCI after decoding the PSCCH communication, where the source ID identifies the transmitting sidelink UE and the destination ID identifies the receiving sidelink UE.

As indicated above, FIG. 3 is provided as an example. Other examples may differ from what is described with respect to FIG. 3.

Figure 4:
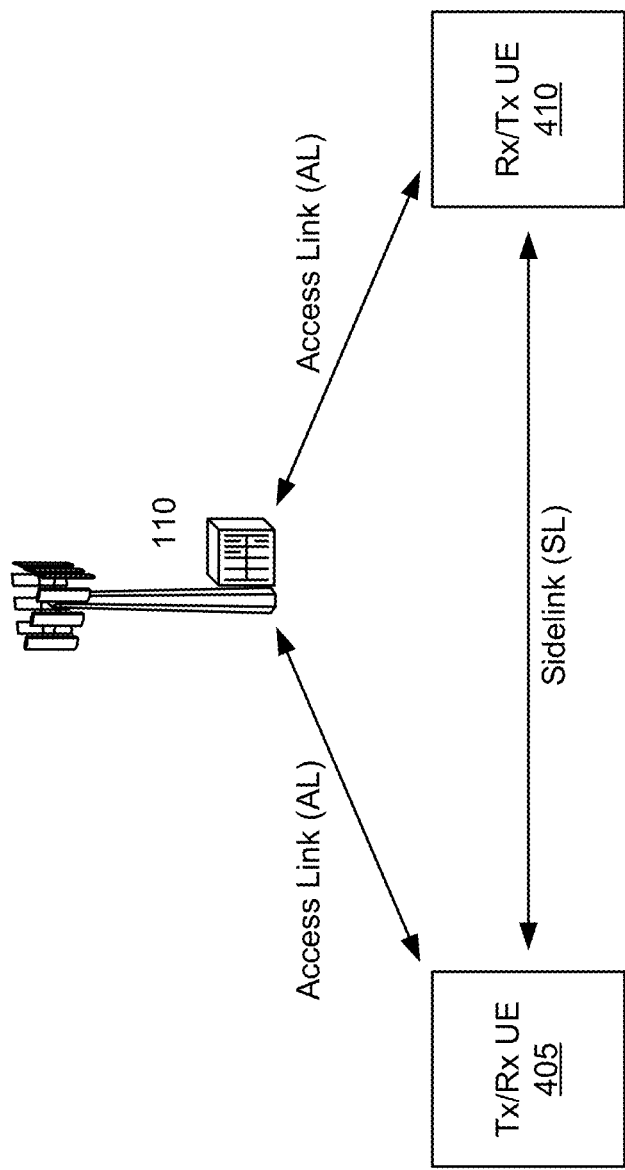
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 May communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
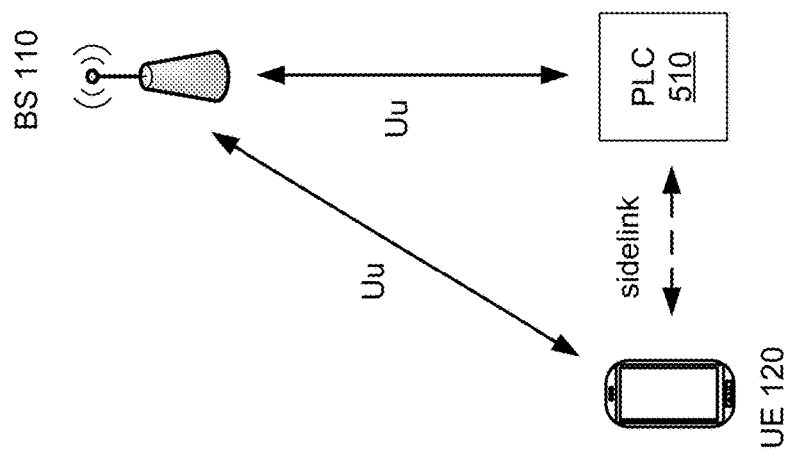
FIG. 5 is a diagram illustrating an example of multi-path diversity, in accordance with the present disclosure.

FIG. 5 is a diagram illustrating an example 500 of multi-path diversity, in accordance with the present disclosure. Example 500 shows a base station (e.g., base station 110) and a UE (e.g., UE 120) that may communicate with each other. The base station 110 and the UE 120 may also communicate with a sidelink UE (e.g., PLC 510).

Multi-path diversity may be used for a first device that communicates with a second device in a wireless communication network. A first device (e.g., UE 120) may communicate with a second device (e.g., PLC 510) via a sidelink. However, if the sidelink is blocked or not reliable, the UE 120 may use a two-hop Uu link to the PLC 510 via the base station 110 for better reliability. The UE 120 and/or the PLC 510 may be configured to use both the sidelink and the Uu links as necessary. Having access to either path or access to multiple points or paths at the same time may be referred to as a multi-point communication mode. If the UE 120 (or the PLC 510) is able to switch to the multi-point communication mode, the UE 120 and the PLC 510 may improve the reliability of communications. In a scenario with multiple TRPs, the UE 120 in multi-point communication mode (mTRP mode) may switch from one TRP to another TRP or access multiple TRPs at the same time.

As indicated above, FIG. 5 is provided as an example. Other examples may differ from what is described with regard to FIG. 5.

Figure 6:
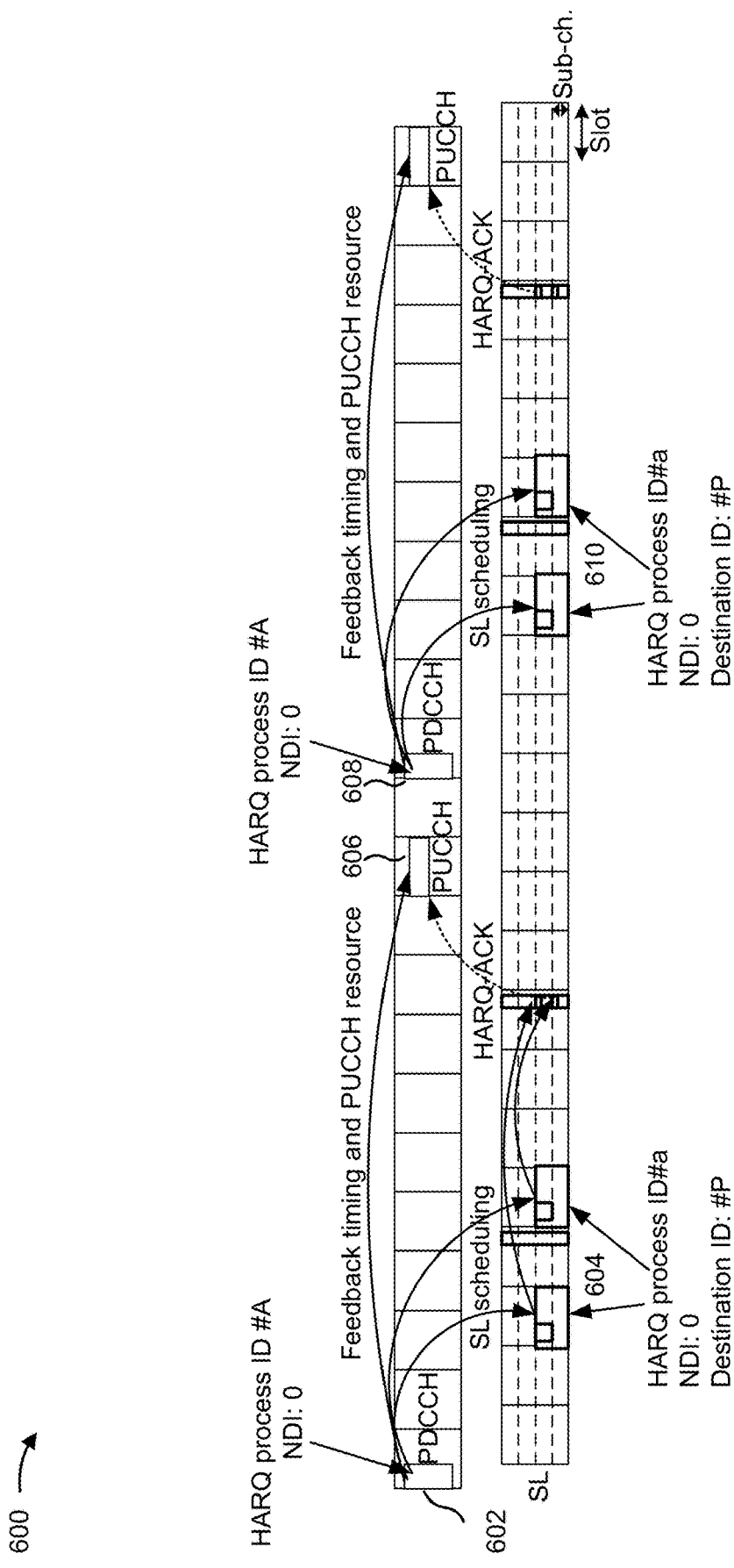
FIG. 6 is a diagram illustrating an example of sidelink resource allocation, in accordance with the present disclosure.

FIG. 6 is a diagram illustrating an example 600 of sidelink resource allocation, in accordance with the present disclosure.

Example 600 shows a first PDCCH communication 602 that includes a DCI (format DCI 3_0) that allocates resources for a TB. The DCI may schedule resources 604 (e.g., 2 or 3 resources) for sidelink communication of the TB from a transmitting sidelink UE to a receiving sidelink UE. A destination ID for the receiving sidelink UE may not be specified in the DCI. That is, in the current standard, the base station 110 (e.g., gNB) does not know the receiving sidelink UE.

The receiving sidelink UE may provide HARQ feedback to the transmitting sidelink UE, and the transmitting sidelink UE may provide the HARQ feedback to the base station 110 in a PUCCH communication 606. The transmitting sidelink UE may maintain a one-to-one mapping of a HARQ process number in the DCI to a HARQ process number in the SCI for the TB. For example, the HARQ process ID #A of the first PDCCH communication 602 may be mapped to the HARQ process ID #a of the resources 604. If the HARQ feedback in the PUCCH communication 606 indicates that the sidelink communication is not successful, the base station 110 may transmit a second PDCCH communication 608 with sidelink resources 610 for a retransmission of the sidelink communication.

An NDI in the DCI may indicate whether sidelink resources are for a new transmission or a retransmission. The NDI in the DCI may be used to toggle (change the value of) an NDI in the SCI. NDI values of 0 in example 600 indicate new transmissions. An NDI value of 1 for the second PDCCH communication 608 would have indicated a retransmission.

As indicated above, FIG. 6 is provided as an example. Other examples may differ from what is described with regard to FIG. 6.

Figure 7:
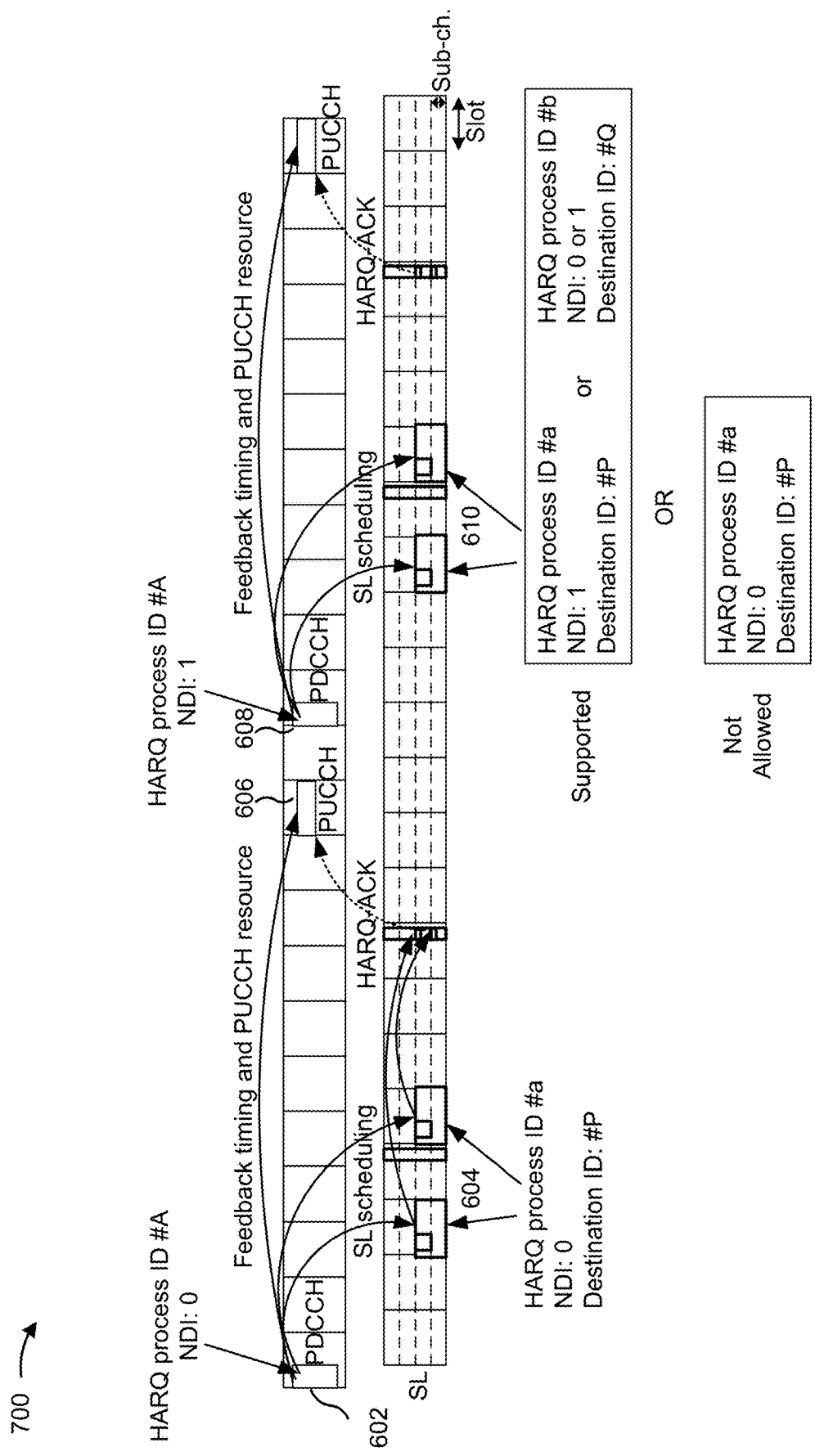
FIG. 7 is a diagram illustrating an example of sidelink resource allocation, in accordance with the present disclosure.

FIG. 7 is a diagram illustrating an example 700 of sidelink resource allocation, in accordance with the present disclosure.

Example 700 shows the PDCCH communications of example 600 that include the DCI that allocates resources for the TB. However, example 700 illustrates current limitations of the base station 110 and the transmitting sidelink UE.

For sidelink Mode 1 of 3GPP NR standard Release 16, the base station 110 has a certain level of control and the transmitting sidelink UE has a certain level of freedom. For example, the base station 110 may allocate a resource for one TB to the transmitting sidelink UE and a resource for retransmission of the TB. An NDI can force a transmitting sidelink UE to drop the retransmission of the TB (e.g., with a maximum quantity of retransmissions). The base station may also configure (e.g., via RRC signaling) an MCS range (e.g., minimum MCS to maximum MCS). The UE may select an MCS within the MCS range and determine which TB to transmit (including destination ID or receiver ID) using the resource provided by the base station. The UE may enable or disable sidelink HARQ and select HARQ process numbers. The UE may also select a DMRS pattern/port, layers, precoding, a CSI-RS, a redundancy version ID (RV-ID), and/or a cast type.

However, the base station 110's control is not strict enough to manage interference associated with the receiving sidelink UE without having information about the receiving sidelink UE. In FR1, the base station 110 may increase the reuse of spatial resources if a transmitting sidelink UE's transmit power towards the receiving sidelink UE is known to the base station 110. In FR2, there may be a large gain if the base station 110 knows a transmit beam direction to the receiving sidelink UE. However, the base station 110's control is not flexible enough for a transmitting sidelink UE's autonomous operation. The transmitting sidelink UE is not allowed to use a resource allocation for multiple TBs. The UE must also follow the NDI in the DCI, which makes the UE prone to NACK-to-ACK PUCCH error. For example, a sidelink resource granted by the base station 110 may be for transmitting a packet to a destination UE (receiving sidelink UE). The base station 110 does not provide multiple resources to the transmitting sidelink UE and then allow the transmitting sidelink UE to determine how many resources to use for each destination UE. Such flexibility at the transmitting sidelink UE is not allowed by the current standard.

The lack of flexibility at the transmitting sidelink UE may be an issue with retransmissions. In example 700, the UE does not have control over whether to stop retransmission of a first TB and transmit another TB. For example, the first PDCCH communication 602 has an NDI value of 0. The NDI of the second PDCCH communication 608 is toggled from 0 to 1 to indicate a retransmission for HARQ process ID #A. The SCI NDI for sidelink HARQ process ID #a (corresponding to HARQ process ID #A of the second PDCCH communication 608) has to match the value of 1 of the NDI in the second PDCCH communication 608. The transmitting sidelink UE is not able to change the NDI value for HARQ process ID #a to 0 in order to stop the retransmission and provide a new transmission to the receiving sidelink UE (or to another destination UE).

As indicated above, FIG. 7 is provided as an example. Other examples may differ from what is described with regard to FIG. 7.

Figure 8:
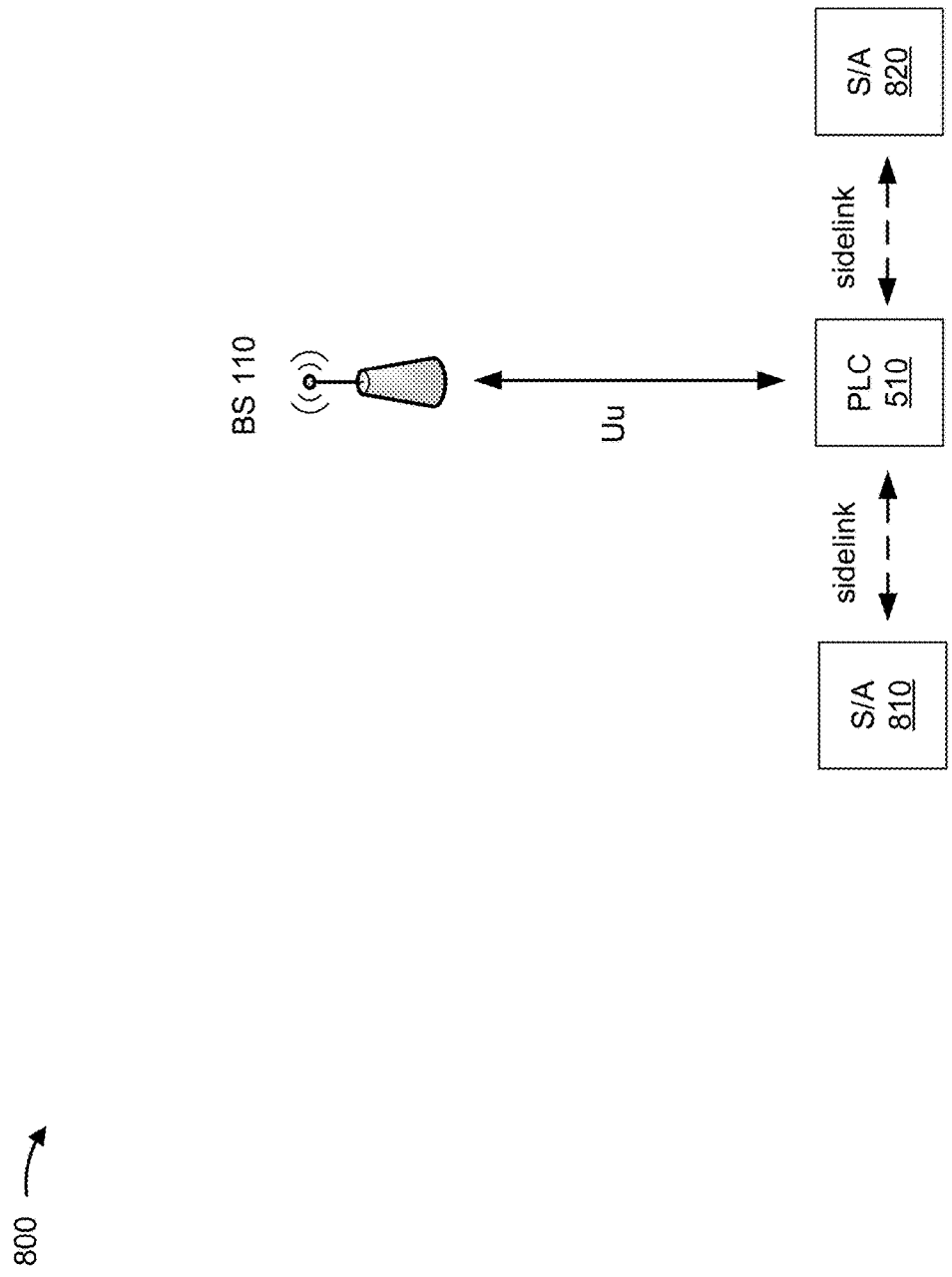
FIG. 8 is a diagram illustrating an example associated with, in accordance with the present disclosure.

FIG. 8 is a diagram illustrating an example 800 associated with, in accordance with the present disclosure. As shown in example 800, a sidelink UE (e.g., PLC 510) may communicate with a first wireless device, such as sensor/actuator (S/A) 810 (e.g., a UE 120), and a second wireless device, such as S/A 820 (e.g., a UE 120) over sidelinks. A base station (e.g., BS 110) may communicate with the PLC 510 over a Uu link.

According to various aspects described herein, the base station 110 may have a more relaxed control of the transmitting sidelink UE (e.g., PLC 510) than in Sidelink Mode 1 and the PLC 510 may have more freedom to determine sidelink resource usage than in Sidelink Mode 1. The base station 110 and the PLC 510 may operate in a new sidelink mode that may be referred to as "Sidelink Mode 1.5". The base station 110 may allocate resources to the PLC 510 in one shot or periodically. The PLC 510 may be free to use the allocated resources for different TBs and/or for different receiving sidelink UEs (transmission and/or reception). Accordingly, the base station 110 may omit the HARQ process number and/or the NDI in the DCI to the PLC 510. The base station 110 may still specify a maximum transmit power or beam information.

To assist the base station 110 with the allocation of the resources, the transmitting sidelink UE (e.g., PLC 510) may transmit a sidelink BSR to the base station 110. In some aspects, the BSR may be included in or with an SR. In some aspects, the BSR may be an accumulative BSR, where the PLC 510 accumulates information about a buffer status for each of multiple devices. For example, the BSR may include a combined sidelink buffer status of a buffer status of S/A 810 and a buffer status of S/A 820.

The base station 110 may, based at least in part on the combined sidelink buffer status, transmit a grant of resources to the PLC 510, where the PLC 510 is free to determine how to distribute the resources for TBs and to S/A 810 and S/A 820. The base station 110 may transmit a dynamic grant (DG)-like resource grant or a configured grant (CG)-like resource grant. These resource grants may include use of a new format or design for the DCI over an existing DCI 3_0 format. A design for sidelink HARQ reporting may specified or dedicated for use of a combined sidelink buffer status.

For example, rather than granting 5 kilobytes (KB) to S/A 810 and 10 KB to S/A 820, the base station 110 may grant 1 megabyte (MB) to the PLC 510 such that the PLC 510 determines what resources to grant to S/A 810, S/A 820, and other multiple wireless devices (e.g., 50 other S/As). The 1 MB grant may be based at least in part on the combined sidelink buffer status of the multiple S/As that is reported in the BSR (e.g., 1 MB combined amount of data in buffers). The PLC 510 may report and/or use different amounts of sidelink resources for a transmission direction than for a reception direction. That is, the PLC 510 may transmit using the sidelink resources and/or receive using the sidelink resources. This may involve the PLC 510 granting sidelink resources to S/A 810, S/A 820, and the other multiple devices.

In some aspects, the BSR may be a preemptive BSR, where the PLC 510 estimates resource requirements for transmitting one or more TBs to the multiple wireless devices and provides the estimate to the base station 110. The PLC 510 may use the preemptive BSR to request a specific amount of resources for transmitting TBs to S/A 810, S/A 820, and other S/As. As a result, the PLC 510 may allocate sidelink resources more efficiently and cause the base station 110, the PLC 510, and the S/As to conserve processing resources and signaling resources.

In some aspects, the combined sidelink BSR may include a negative amount of resources. In this way, the base station 110 may use less resources than allocated or may take back some resources. The PLC 510 may give up some resources by using the negative amount. The base station 110 may use a sidelink cancellation indicator (SLCI) to cancel some granted resources.

Alternatively, in some aspects, the PLC 510 may use the buffer status of each of the multiple devices to request the specific amount of sidelink resources without transmitting a combined sidelink buffer status in a BSR to the base station 110.

As indicated above, FIG. 8 is provided as an example. Other examples may differ from what is described with regard to FIG. 8.

Figure 9:
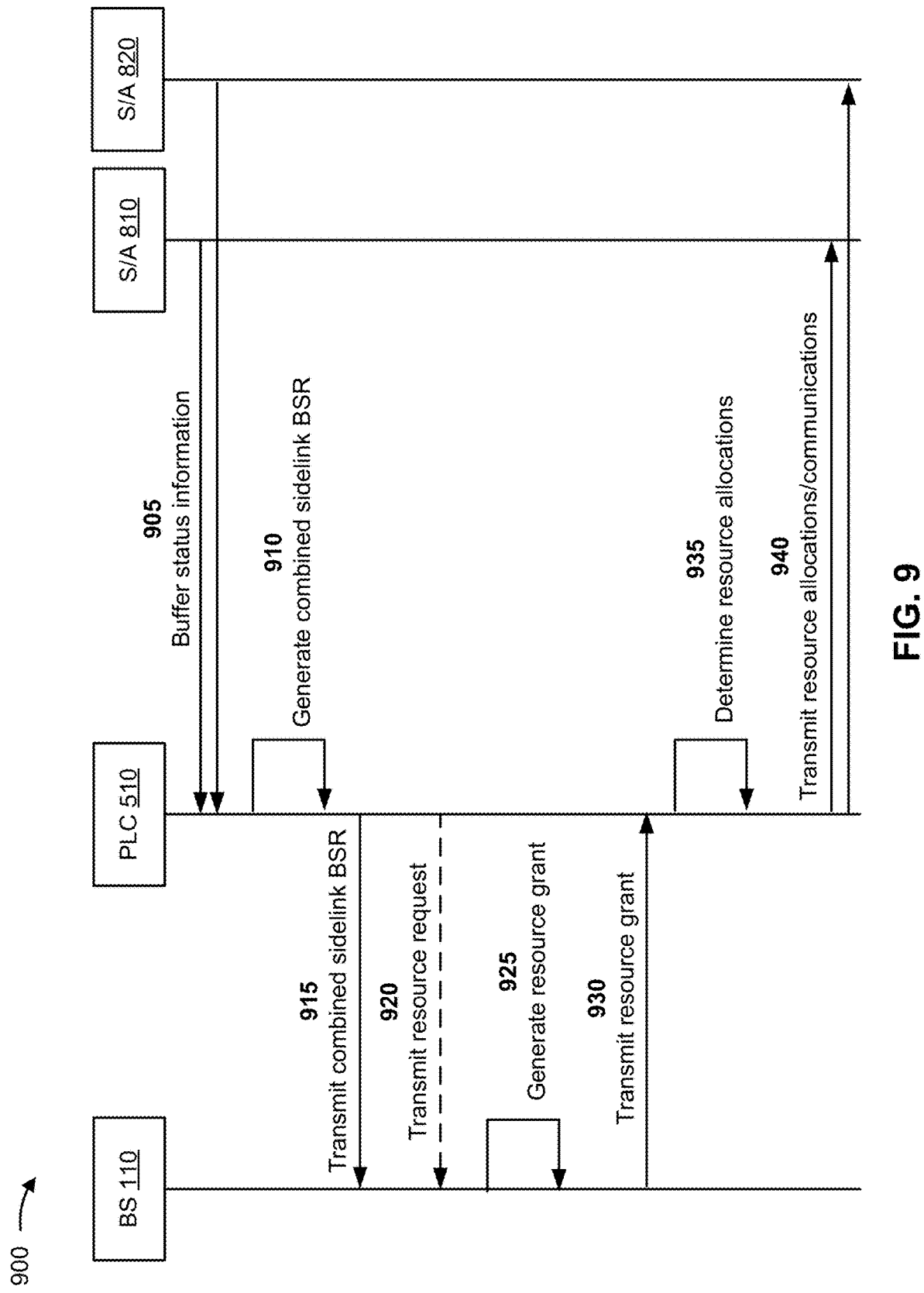
FIG. 9 is a diagram illustrating an example associated with using a combined sidelink buffer status report (BSR) for multiple destination devices, in accordance with the present disclosure.

FIG. 9 is a diagram illustrating an example 900 associated with using a combined sidelink BSR for multiple destination devices, in accordance with the present disclosure. As shown in example 900, a sidelink UE (e.g., PLC 510) may communicate with multiple devices, such as S/A 810 and S/A 820. While S/A 810 and S/A 820 are shown in example 900, PLC 510 may communicate with any quantity of wireless devices. A base station (e.g., BS 110) may communicate with the PLC 510 over a Uu link.

Example 900 provides an example of a transmitting sidelink UE using a combined sidelink BSR to obtain resources that the transmitting sidelink UE is free to use as the transmitting sidelink UE determines. The combined sidelink BSR may be an accumulative BSR that does not report separate BSRs for each destination UE. As shown by reference number 905, the transmitting sidelink UE (e.g., PLC 510) May receive buffer status information from each of multiple devices, such as from S/A 810 and S/A 820. The buffer status information may be received in a sidelink medium access control control element (MAC CE). As shown by reference number 910, the PLC 510 may generate a combined sidelink BSR based at least in part on the buffer status information from the multiple devices. This may include summing the buffer amounts of the multiple devices to obtain a total amount. The PLC 510 may add or subtract from the total amount based on other estimated changes for resource requirements. The combined sidelink BSR may be for the total amount of data that is to be received and/or transmitted.

Alternatively or additionally, the combined sidelink BSR may be a preemptive BSR that is based at least in part on an estimate of data that is expected to arrive at the PLC 510 from S/As that are connected to the PLC 510. For example, the PLC 510 may sum estimates of data from the S/As.

As shown by reference number 915, the PLC 510 may transmit the combined sidelink BSR to the base station 110. In some aspects, the PLC 510 may transmit the combined sidelink BSR in a sidelink MAC CE. Use of an accumulative BSR or a preemptive BSR may be triggered by an SR procedure. The combined sidelink BSR may be included in or with an SR.

The PLC 510 may transmit the combined sidelink BSR in response to receiving an SR configuration. The base station 110 may configure an SR configuration that is dedicated for using an accumulative BSR or preemptive BSR. The SR configuration may be subdivided for each logical channel. The SR configuration may include a periodicity that is allowed for a BSR and/or a timer where the BSR is not allowed. The base station 110 may schedule resources for an accumulative BSR or a preemptive BSR once an SR dedicated for accumulative BSR or preemptive BSR is received. The base station 110 may allow an accumulative BSR or a preemptive BSR without an SR (e.g., whenever PUSCH resources are granted) subject to a prohibit timer where an accumulative BSR or a preemptive BSR is not allowed if the timer is running.

The combined sidelink BSR may exclude data that the PLC 510 can handle using currently available resources within a latency bound. The PLC 510 may first calculate a total buffer size that awaits transmissions in the buffer and then calculate a data amount that can be handled using currently granted resources. The PLC 510 may report the difference between the total buffer size for awaiting transmissions in the buffer of the PLC 510 and the amount of data that the PLC 510 is able to handle using currently granted resources. The reported buffer size may be negative, to indicate that less resources are required.

In some aspects, the PLC 510 may calculate a buffer size for each destination UE based at least in part on a reported buffer size by the destination UE and a predicted modulation and coding scheme (MCS). For example, the reported buffer size may be scaled by a predicted MCS order and/or a coding rate (e.g., MCS order times coding rate). The PLC 510 may predict the MCS based at least in part on an RSRP reported by a destination UE. The PLC 510 may apply a preconfigured weight to a buffer status, where the preconfigured weight corresponds to an MCS order and/or a RSRP value.

Alternatively or additionally, as shown by reference number 920, the PLC 510 may transmit a resource request that is based on the buffer amounts of the multiple devices, without transmitting the combined sidelink BSR. The resource request may request resources for a quantity of resource elements (REs) and/or subchannels that are needed within a configured report periodicity.

As shown by reference number 925, the base station 110 may generate a resource grant for the PLC 510 based at least in part on the combined sidelink BSR. The resource grant may be a combined grant that is a resource grant for multiple destination UEs and that is to be distributed by the PLC 510. The amount of the resource grant may match the amount of the combined sidelink BSR or may be adjusted to be greater than or less than the amount of the combined sidelink BSR. The base station 110 adjust the amount based at least in part on a history of resource grants, existing resource grants, planned resource grants, traffic amounts, channel conditions, UE statuses, and/or UE capabilities. As shown by reference number 930, the base station 110 may transmit the resource grant to the PLC 510. The resource grant may be a general grant of sidelink resources for the PLC 510 to use.

As shown by reference number 935, the PLC 510 may determine resource allocations to S/A 810, S/A 820, and/or other S/As from the resource grant. That is, the PLC 510 may determine the resource allocations for the S/As independent of any instruction from the base station 110 specifying an amount of the resources to grant to each of the multiple devices. The resource allocations may be based at least in part on the reported buffer statuses of the S/As. For example, the PLC 510 may determine a first subset of the resources indicated in the resource grant for transmission to S/A 810 based at least in part on the buffer status of S/A 810 and/or a channel condition (e.g., considering interference) associated with S/A 810. The PLC 510 may determine a second subset of the resources indicated in the resource grant for transmission to S/A 820 based at least in part on the buffer status of S/A 820 and/or a channel condition associated with S/A 820.

As shown by reference number 940, the PLC 510 may transmit resource allocations and/or communications to S/A 810, S/A 820, and/or other S/As. This may include, for example, transmitting communications using the first subset of resources to S/A 810 or transmitting a grant of the first subset of resources to S/A 810. The PLC 510 may also transmit communications using the second subset of resources to S/A 820 or transmit a grant of the second subset of resources to S/A 820. By granting a block of sidelink resources to PLC 510 and allowing PLC 510 to determine how to use the sidelink resources, the PLC 510 may manage interference and allocate resources better than if constricted to resource allocations directed by the base station 110. As a result, communications may improve and the base station 110, the PLC 510, and/or the S/As may conserve processing resources and signaling resources.

As indicated above, FIG. 9 is provided as an example. Other examples may differ from what is described with respect to FIG. 9.

Figure 10:
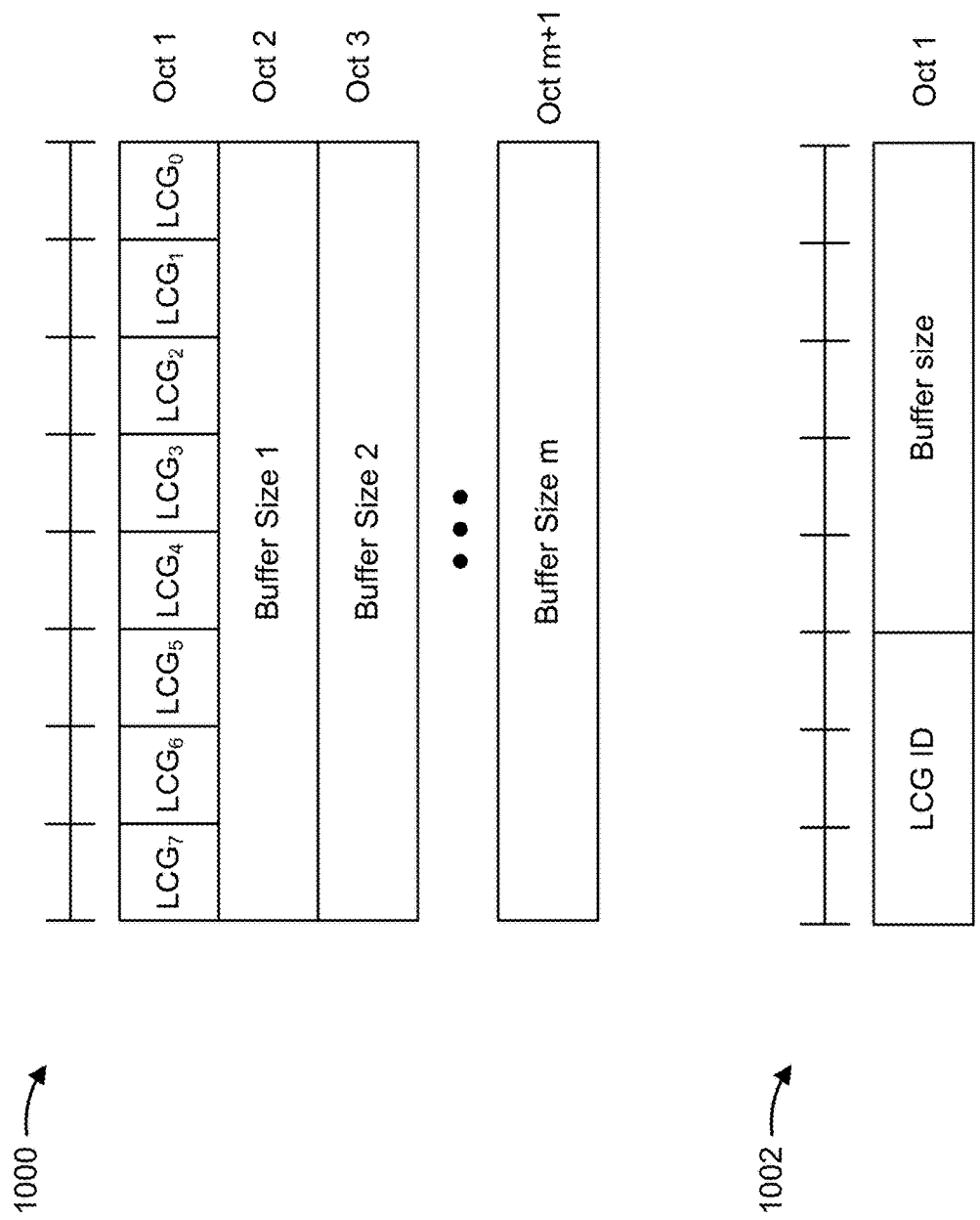
FIG. 10 is a diagram illustrating examples of a combined sidelink BSR, in accordance with the present disclosure.

FIG. 10 is a diagram illustrating examples 1000 and 1002 of a combined sidelink BSR, in accordance with the present disclosure.

The BSR (accumulative BSR or preemptive BSR) may be for all destinations for each logical channel group (LCG). A logical channel may be a control channel that is used for the transmission of control and configuration information. A logical channel may also be a traffic channel that is used for the transmission of user data. An LCG may be a group of logical channels for which a buffer status is being reported. The PLC 510 may use a long format for the BSR. Example 1000 shows a BSR in a MAC CE that includes bits for indicating LCGs and buffer sizes for each LCG. Alternatively, the PLC 510 may use a short format. Example 1002 shows a BSR in a MAC CE with a buffer size for a specific LCG that is indicated with a logical channel ID (e.g., an enhanced logical channel ID). In some aspects, the BSR may be enabled only for a certain logical channel and the logical channel ID may be omitted from the MAC CE.

As indicated above, FIG. 10 provides some examples. Other examples may differ from what is described with respect to FIG. 10.

Figure 11:
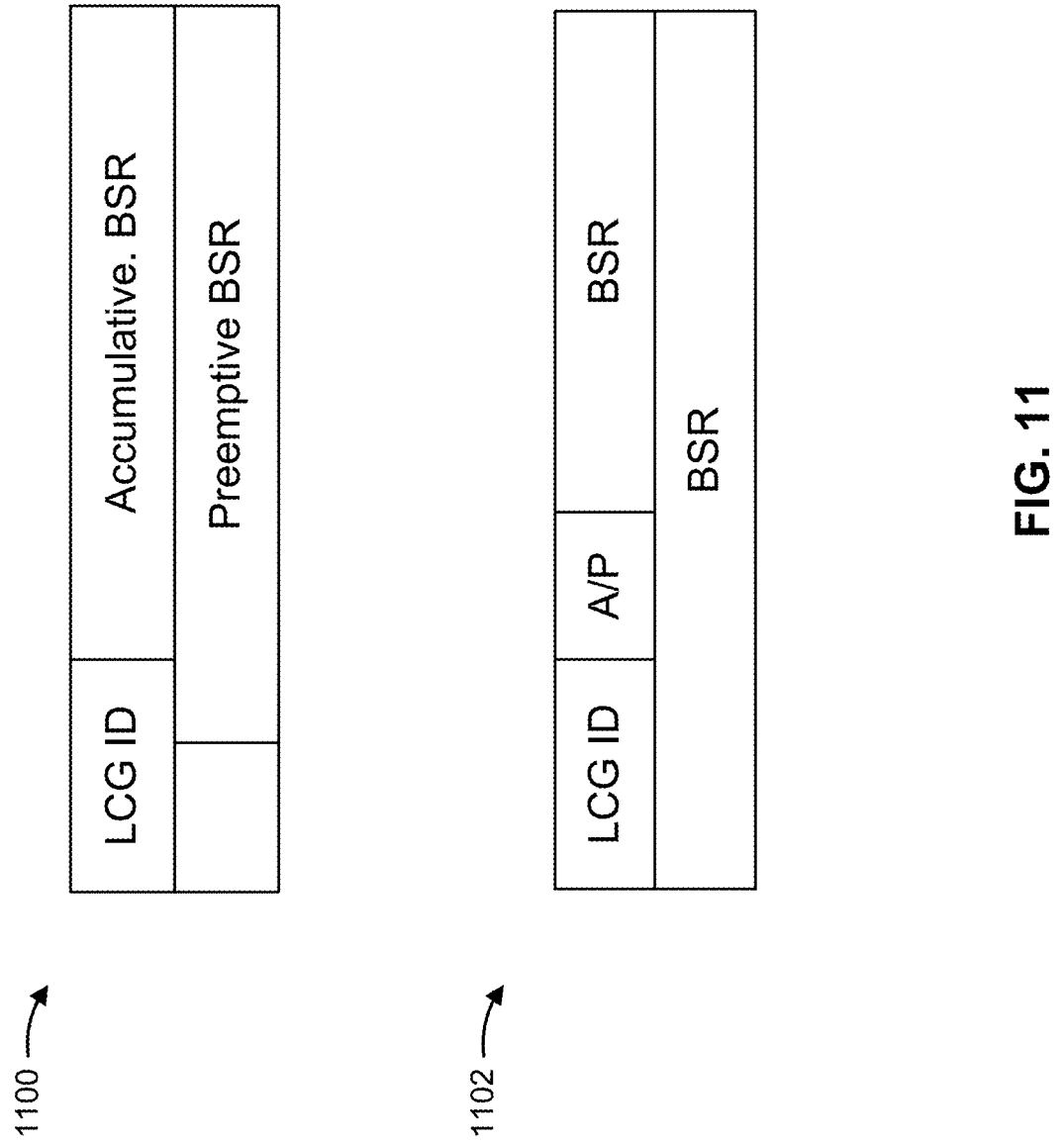
FIG. 11 is a diagram illustrating examples of BSRs, in accordance with the present disclosure.

FIG. 11 is a diagram illustrating examples 1100 and 1102 of BSRs, in accordance with the present disclosure.

In some aspects, the combined sidelink BSR may include a combination of an accumulative BSR and a preemptive BSR. For example, the BSR may include a combination of a sum of buffer statuses of the S/As and/or a predicted amount of data that is expected to arrive at the PLC 510 from the S/As. The BSR may be for a data amount in both the transmitting direction and the receiving direction. The buffer statuses may be weighted with respect to each other or the amount of data that is expected to arrive. For example, the BSR may be weighted or scaled (with $w\_1, w\_2, \ldots$) in the form of BSR=$(w\_1 \times \text{Buffer1}) + (w\_2 \times \text{Buffer2}) + \ldots$. The BSR may also be in the form of BSR=$(w\_1 \times \text{accumulative BSR}) + (w\_2 \times \text{preemptive BSR})$. The weights (or scaling factors) $w\_1$ and $w\_2$ may be configured to account for different UE capabilities for MCS support, transmit power, or other properties that are different for the PLC 510 and the S/As. The PLC 510 may transmit the combined sidelink BSR in a MAC CE, such as shown in FIG. 10.

Example 1100 shows a short format MAC CE with two separate BSR entries for the accumulative BSR and the preemptive BSR. The separate entries may be associated with a LCG ID (or a logical channel ID). A long format MAC CE may include separate entries for each of multiple LCGs or multiple logical channels.

Example 1102 shows a short format MAC CE with an accumulative/preemptive indicator field or bit (A/P) and two BSR entries. The A/P field or bit may indicate that the BSR entries include an accumulative BSR and a preemptive BSR, a sum of both an accumulative BSR and a preemptive BSR, two accumulative BSRs, two preemptive BSRs, or some other combination of BSRs. A long format MAC CE may include separate entries for each of multiple LCGs or multiple logical channels. In some aspects, the S/As and/or the PLC 510 may transmit buffer status information, BSRs, and/or resource grants in uplink control information (UCI) in a PUCCH.

In some aspects, the accumulative BSR and/or the preemptive BSR may be configured only for certain UEs, such as for the PLC 510 and some S/As but not for other S/As. The use of an accumulative BSR and/or a preemptive BSR may be allowed if the PLC 510 is communicating with a threshold quantity (e.g., a minimum quantity of destination UEs) of S/As, if the PLC 510 is a group-lead UE that schedules transmissions for other sidelink UEs, and/or if the PLC 510 has a UE capability that is above a UE capability threshold (e.g., a maximum transmit power threshold).

As indicated above, FIG. 11 provides some examples. Other examples may differ from what is described with regard to FIG. 11.

Figure 12:
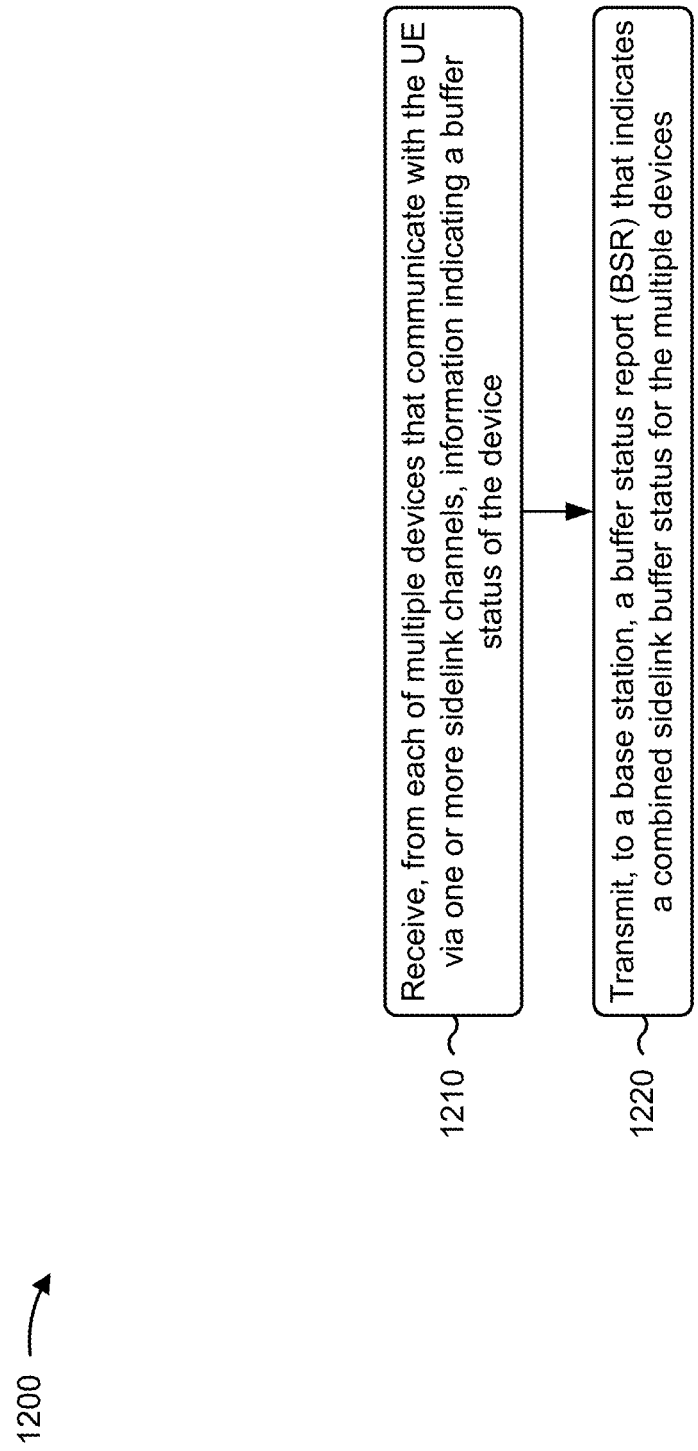
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120, PLC 510) performs operations associated with using a BSR for multiple devices.

As shown in FIG. 12, in some aspects, process 1200 may include receiving, from each of multiple devices that communicate with the UE via one or more sidelink channels, information indicating a buffer status of the device (block 1210). For example, the UE (e.g., using communication manager 140 and/or reception component 1602 depicted in FIG. 16) may receive, from each of multiple devices that communicate with the UE via one or more sidelink channels, information indicating a buffer status of the device, as described above in connection with FIGS. 3-11.

As further shown in FIG. 12, in some aspects, process 1200 may include transmitting, to a base station, a BSR that indicates a combined sidelink buffer status for the multiple devices (block 1220). For example, the UE (e.g., using communication manager 140 and/or transmission component 1604 depicted in FIG. 16) may transmit, to a base station, a BSR that indicates a combined sidelink buffer status for the multiple devices, as described above in connection with FIGS. 3-11.

Process 1200 may include additional aspects, such as any single aspect or any combination of aspects described below and/or in connection with one or more other processes described elsewhere herein.

In a first aspect, process 1200 includes receiving a combined grant for the multiple devices and transmitting resources of the combined grant to each of the multiple devices independent of an instruction from the base station specifying an amount of the resources to grant to each of the multiple devices.

In a second aspect, alone or in combination with the first aspect, receiving the information from each of the multiple devices includes receiving the information in a sidelink MAC CE.

In a third aspect, alone or in combination with one or more of the first and second aspects, the BSR includes a sum of the buffer statuses of the multiple devices.

In a fourth aspect, alone or in combination with one or more of the first through third aspects, the BSR indicates a difference between a total buffer size for awaiting transmissions in the buffer of the UE and an amount of data that the UE is able to handle using currently granted resources.

In a fifth aspect, alone or in combination with one or more of the first through fourth aspects, the difference is a negative value that indicates an amount of the currently granted resources that will not be used.

In a sixth aspect, alone or in combination with one or more of the first through fifth aspects, the BSR indicates a predicted amount of data that is expected to arrive at the UE from the multiple devices.

In a seventh aspect, alone or in combination with one or more of the first through sixth aspects, the BSR includes a combination of a sum of buffer statuses of the multiple devices and a predicted amount of data that is expected to arrive at the UE from the multiple devices.

In an eighth aspect, alone or in combination with one or more of the first through seventh aspects, the BSR is for a total amount of data that is to be received and to be transmitted.

In a ninth aspect, alone or in combination with one or more of the first through eighth aspects, the sum and the predicted amount of data are each weighted or scaled based at least in part on one or more of a predicted MCS for each of the multiple devices, a transmit power for each of the multiple devices, or a capability of each of the multiple devices for buffering or transmitting.

In a tenth aspect, alone or in combination with one or more of the first through ninth aspects, transmitting the BSR includes transmitting the BSR in a MAC CE with separate entries for the sum and for the predicted amount of data.

In an eleventh aspect, alone or in combination with one or more of the first through tenth aspects, transmitting the BSR includes transmitting the BSR in a MAC CE with an indication that indicates whether the combined sidelink buffer status is for the sum, the predicted amount of data, both the sum and the predicted amount of data separately, or a combination of the sum and the predicted amount of data.

In a twelfth aspect, alone or in combination with one or more of the first through eleventh aspects, transmitting the BSR includes transmitting the BSR based at least in part on whether the UE is communicating to a quantity of UEs that satisfies a UE quantity threshold, the UE is a group-lead UE of a group of UEs, or the UE has a UE capability that satisfies a UE capability threshold.

In a thirteenth aspect, alone or in combination with one or more of the first through twelfth aspects, transmitting the BSR includes transmitting the BSR based at least in part on receiving an SR configuration from the base station.

In a fourteenth aspect, alone or in combination with one or more of the first through thirteenth aspects, the combined sidelink buffer status is based at least in part on one or more of channel conditions for each device or a predicted MCS for each device.

In a fifteenth aspect, alone or in combination with one or more of the first through fourteenth aspects, transmitting the BSR includes transmitting the BSR in a MAC CE that indicates a buffer size for each of multiple LCGs.

In a sixteenth aspect, alone or in combination with one or more of the first through fifteenth aspects, transmitting the BSR includes transmitting the BSR in a MAC CE that indicates a buffer size for a specified LCG.

In a seventeenth aspect, alone or in combination with one or more of the first through sixteenth aspects, the BSR applies to a specified LCG or to all LCGs.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
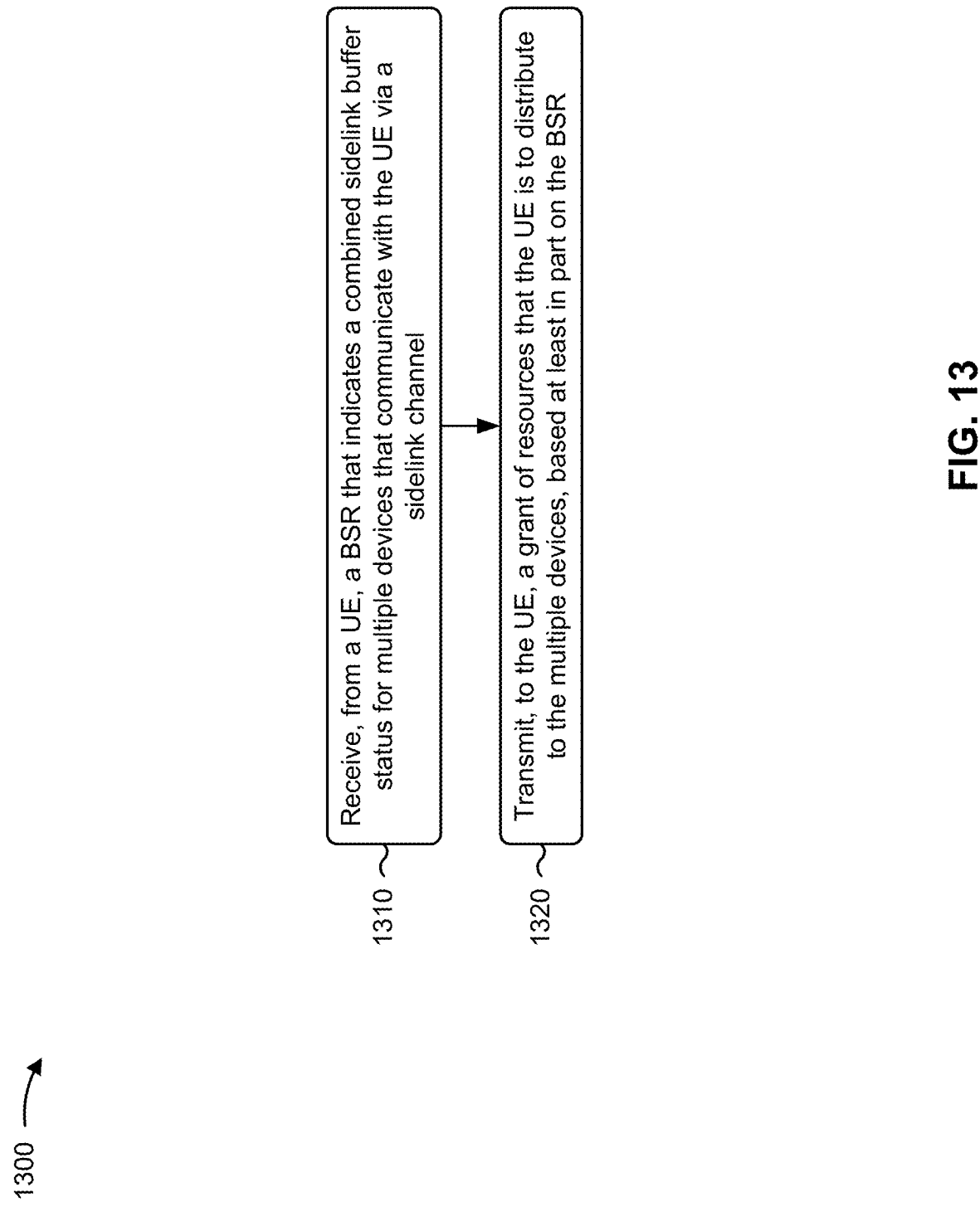
FIG. 13 is a diagram illustrating an example process performed, for example, by a base station, in accordance with the present disclosure.

FIG. 13 is a diagram illustrating an example process 1300 performed, for example, by a base station, in accordance with the present disclosure. Example process 1300 is an example where the base station (e.g., base station 110) performs operations associated with granting resources based on a combined sidelink BSR.

As shown in FIG. 13, in some aspects, process 1300 may include receiving, from a UE, a BSR that indicates a combined sidelink buffer status for multiple devices that communicate with the UE via a sidelink channel (block 1310). For example, the base station (e.g., using communication manager 150 and/or reception component 1702 depicted in FIG. 17) may receive, from a UE, a BSR that indicates a combined sidelink buffer status for multiple devices that communicate with the UE via a sidelink channel, as described above in connection with FIGS. 3-11.

As further shown in FIG. 13, in some aspects, process 1300 may include transmitting, to the UE, a grant of resources that the UE is to distribute to the multiple devices, based at least in part on the BSR (block 1320). For example, the base station (e.g., using communication manager 150 and/or transmission component 1704 depicted in FIG. 17) may transmit, to the UE, a grant of resources that the UE is to distribute to the multiple devices, based at least in part on the BSR, as described above in connection with FIGS. 3-11.

Process 1300 may include additional aspects, such as any single aspect or any combination of aspects described below and/or in connection with one or more other processes described elsewhere herein.

In a first aspect, the BSR includes a sum of the buffer statuses of the multiple devices.

In a second aspect, alone or in combination with the first aspect, the BSR indicates a difference between a total buffer size for awaiting transmissions in the buffer of the UE and an amount of data that the UE is able to handle using currently granted resources.

In a third aspect, alone or in combination with one or more of the first and second aspects, the BSR indicates a predicted amount of data that is expected to arrive at the UE from the multiple devices.

In a fourth aspect, alone or in combination with one or more of the first through third aspects, the BSR includes a combination of a sum of buffer statuses of the multiple devices and a predicted amount of data that is expected to arrive at the UE from the multiple devices.

In a fifth aspect, alone or in combination with one or more of the first through fourth aspects, the sum and the predicted amount of data are each weighted or scaled based at least in part on one or more of a predicted MCS for each of the multiple devices, a transmit power for each of the multiple devices, or a capability of each of the multiple devices for buffering or transmitting.

In a sixth aspect, alone or in combination with one or more of the first through fifth aspects, receiving the BSR includes receiving the BSR based at least in part on transmitting an SR configuration to the UE.

In a seventh aspect, alone or in combination with one or more of the first through sixth aspects, transmitting the grant of resources includes transmitting the grant of resources based at least in part on receiving an SR from the UE or based at least in part on whether a prohibit timer is running.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
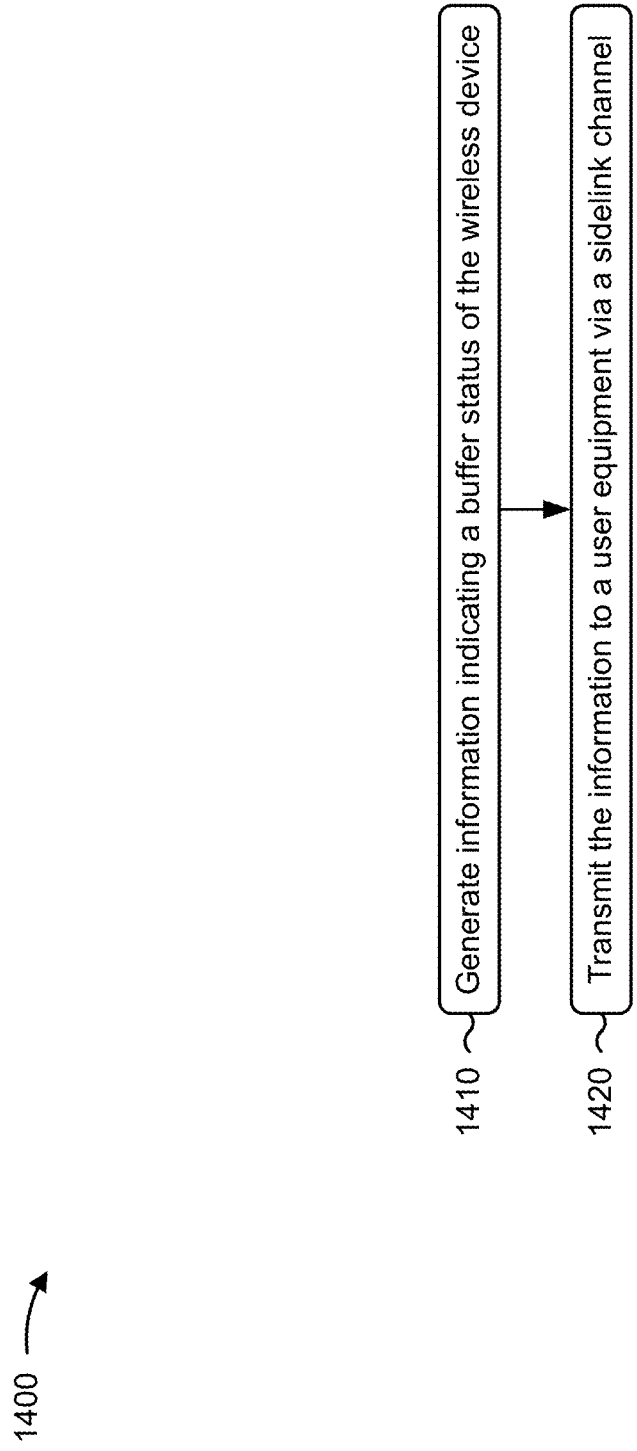
FIG. 14 is a diagram illustrating an example process performed, for example, by a wireless device, in accordance with the present disclosure.

FIG. 14 is a diagram illustrating an example process 1400 performed, for example, by a wireless device, in accordance with the present disclosure. Example process 1400 is an example where the wireless device (e.g., a UE 120, S/A 810, S/A 820) performs operations associated with transmitting buffer status information.

As shown in FIG. 14, in some aspects, process 1400 may include generating information indicating a buffer status of the wireless device (block 1410). For example, the wireless device (e.g., using communication manager 140 and/or buffer status component 1808 depicted in FIG. 18) may generate information indicating a buffer status of the wireless device, as described above in connection with FIGS. 3-11.

As further shown in FIG. 14, in some aspects, process 1400 may include transmitting the information to a user equipment via a sidelink channel (block 1420). For example, the wireless device (e.g., using communication manager 140 and/or transmission component 1804 depicted in FIG. 18) may transmit the information to a user equipment via a sidelink channel, as described above in connection with FIGS. 3-11.

Process 1400 may include additional aspects, such as any single aspect or any combination of aspects described below and/or in connection with one or more other processes described elsewhere herein.

In one aspect, transmitting the information includes transmitting the information in a MAC CE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
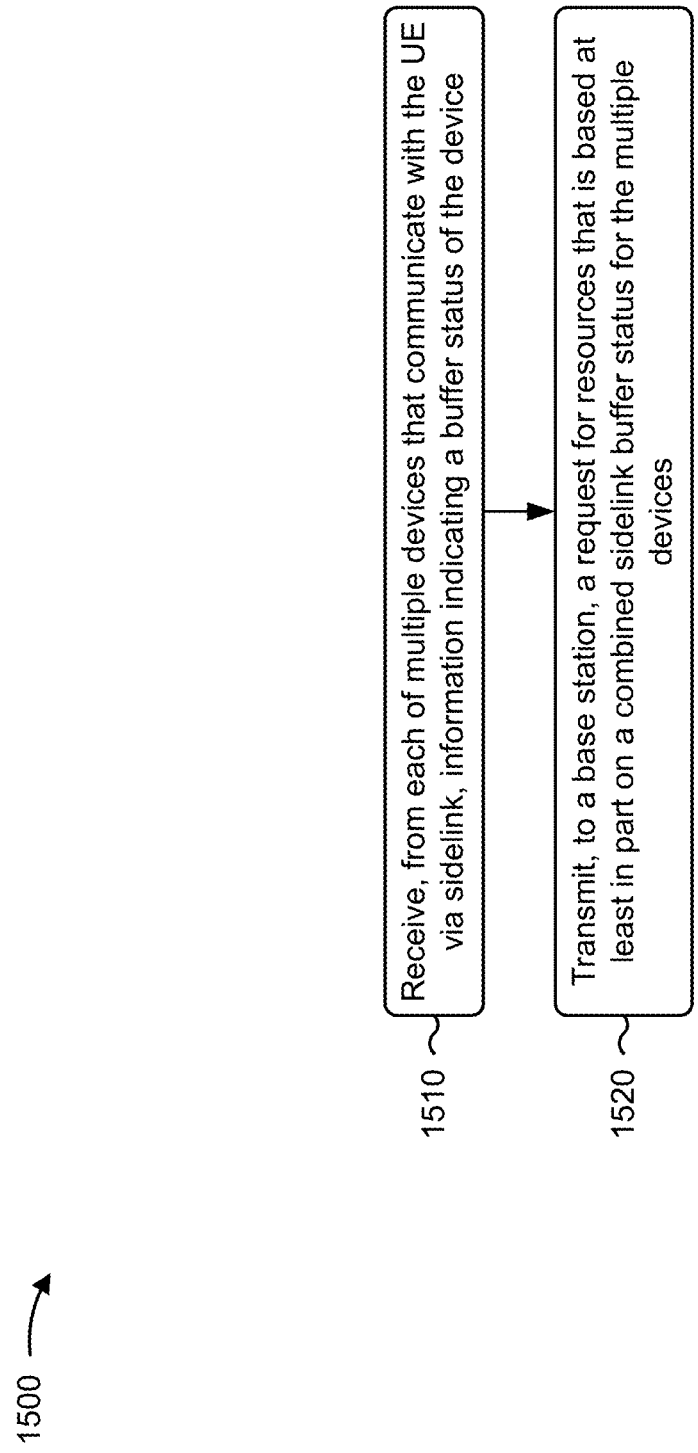
FIG. 15 is a diagram illustrating an example process performed, for example, by a UE, in accordance with the present disclosure.

FIG. 15 is a diagram illustrating an example process 1500 performed, for example, by a UE, in accordance with the present disclosure. Example process 1500 is an example where the UE (e.g., UE 120, PLC 510) performs operations associated with requesting resources to use for multiple devices.

As shown in FIG. 15, in some aspects, process 1500 may include receiving, from each of multiple devices that communicate with the UE via sidelink, information indicating a buffer status of the device (block 1510). For example, the UE (e.g., using communication manager 140 and/or reception component 1602 depicted in FIG. 16) may receive, from each of multiple devices that communicate with the UE via sidelink, information indicating a buffer status of the device, as described above in connection with FIGS. 3-11.

As further shown in FIG. 15, in some aspects, process 1500 may include transmitting, to a base station, a request for resources that is based at least in part on a combined sidelink buffer status for the multiple devices (block 1520). For example, the UE (e.g., using communication manager 140 and/or transmission component 1604 depicted in FIG. 16) may transmit, to a base station, a request for resources that is based at least in part on a combined sidelink buffer status for the multiple devices, as described above in connection with FIGS. 3-11.

Process 1500 may include additional aspects, such as any single aspect or any combination of aspects described below and/or in connection with one or more other processes described elsewhere herein.

In one aspect, the request requests resource elements or subchannels to be used within a configured report periodicity.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
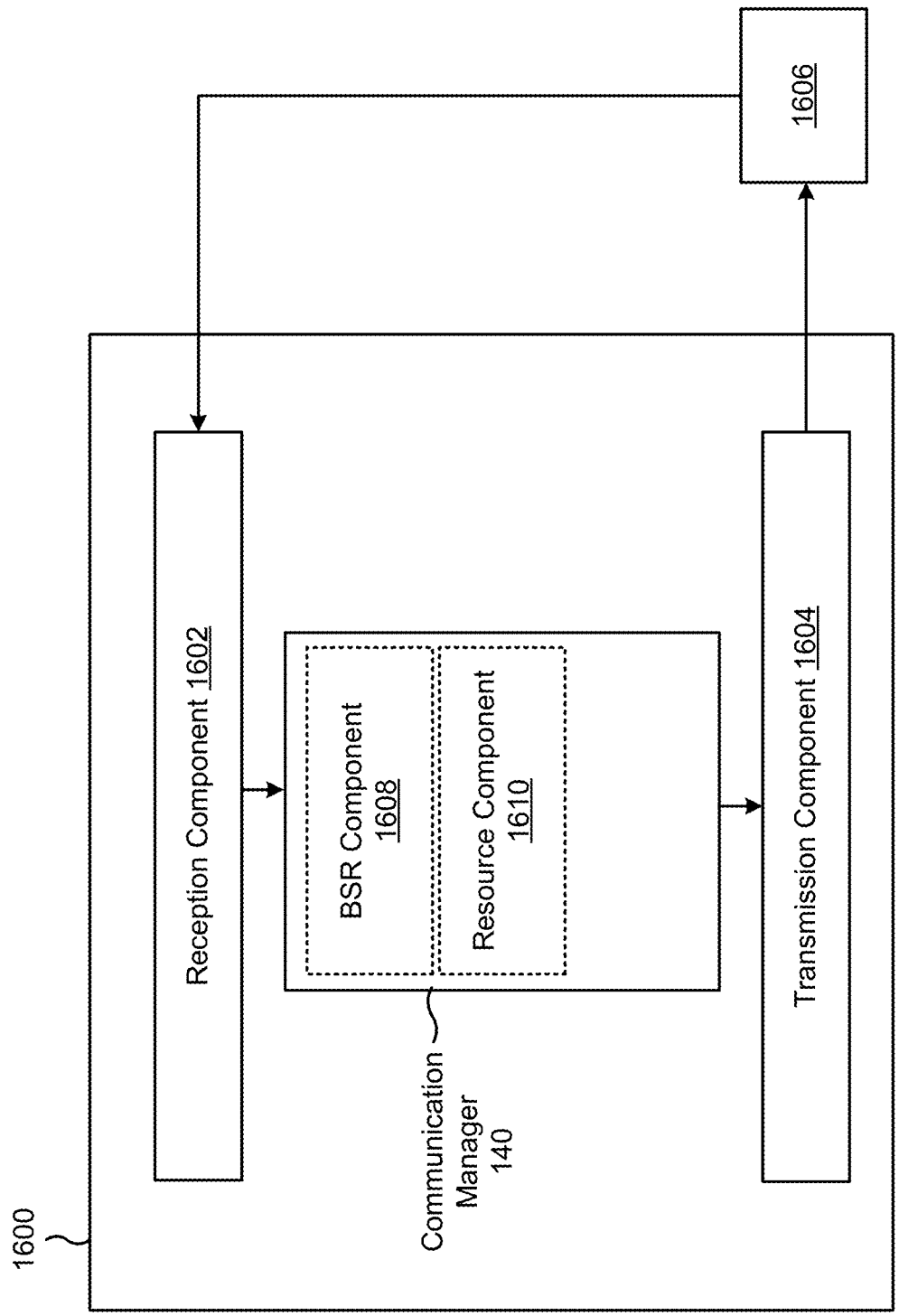
FIGS. 16-18 are diagrams of example apparatuses for wireless communication, in accordance with the present disclosure.

FIG. 16 is a diagram of an example apparatus 1600 for wireless communication. The apparatus 1600 may be a UE (e.g., a UE 120, PLC 510), or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include a BSR component 1608 and/or a resource component 1610, among other examples.

In some aspects, the apparatus 1600 may be configured to perform one or more operations described herein in connection with FIGS. 1-11. Additionally, or alternatively, the apparatus 1600 may be configured to perform one or more processes described herein, such as process 1200 of FIG. 12, process 1500 of FIG. 15, or a combination thereof. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The reception component 1602 may receive, from each of multiple devices that communicate with the UE via one or more sidelink channels, information indicating a buffer status of the device. The transmission component 1604 may transmit, to a base station, a BSR that indicates a combined sidelink buffer status for the multiple devices. The BSR component 1608 may generate the BSR.

The reception component 1602 may receive a combined grant for the multiple devices. The transmission component 1604 may transmit resources of the combined grant to each of the multiple devices independent of an instruction from the base station specifying an amount of the resources to grant to each of the multiple devices. The resource component 1610 may determine how to distribute the resources.

Alternatively, in some aspects, the reception component 1602 may receive, from each of multiple devices that communicate with the UE via sidelink, information indicating a buffer status of the device. The transmission component 1604 may transmit, to a base station, a request for resources that is based at least in part on a combined sidelink buffer status for the multiple devices.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
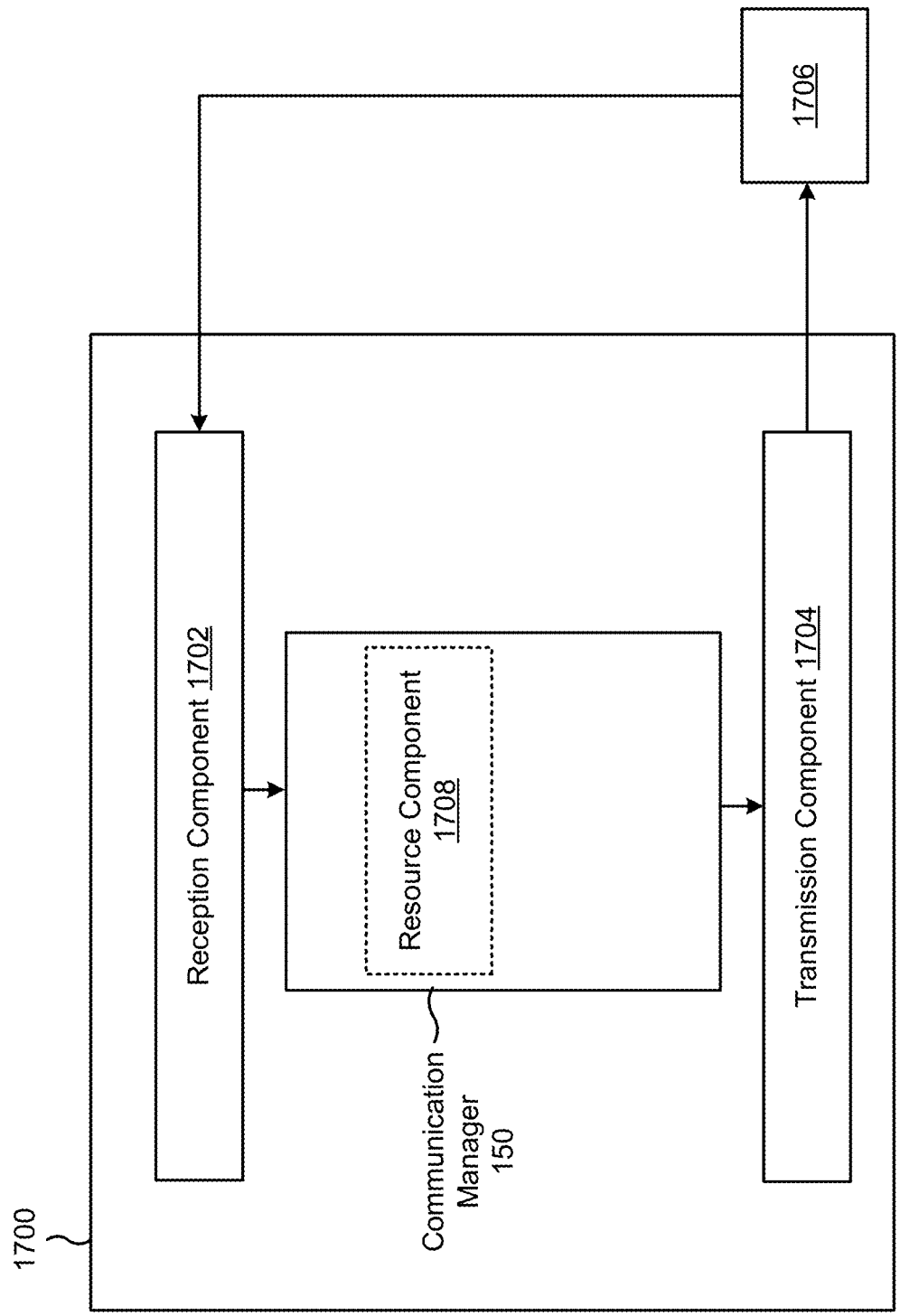

FIG. 17 is a diagram of an example apparatus 1700 for wireless communication. The apparatus 1700 may be a base station (e.g., base station 110), or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 150. The communication manager 150 may include a resource component 1708, among other examples.

In some aspects, the apparatus 1700 may be configured to perform one or more operations described herein in connection with FIGS. 1-11. Additionally, or alternatively, the apparatus 1700 may be configured to perform one or more processes described herein, such as process 1300 of FIG. 13. In some aspects, the apparatus 1700 and/or one or more components shown in FIG. 17 may include one or more components of the base station described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the base station described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the base station described in connection with FIG. 2. In some aspects, the transmission component 1704 may be co-located with the reception component 1702 in a transceiver.

The reception component 1702 may receive, from a UE, a BSR that indicates a combined sidelink buffer status for multiple devices that communicate with the UE via a sidelink channel. The transmission component 1704 may transmit, to the UE, a grant of resources that the UE is to distribute to the multiple devices, based at least in part on the BSR. The resource component 1708 may determine the resources for the UE.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
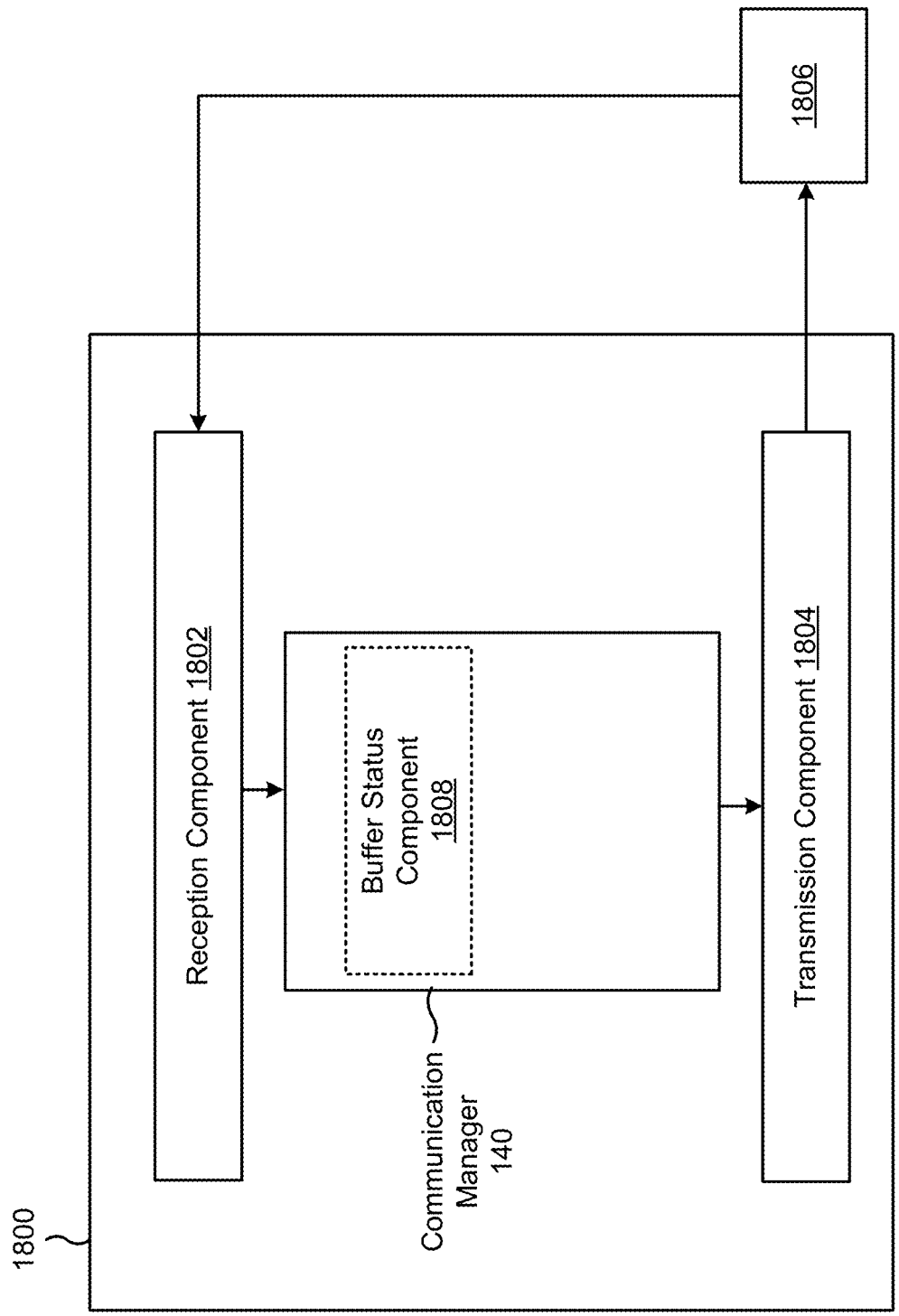

FIG. 18 is a diagram of an example apparatus 1800 for wireless communication. The apparatus 1800 may be a wireless device (e.g., a UE 120, S/A 810, S/A 820), or a wireless device may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include the communication manager 140. The communication manager 140 may include a buffer status component 1808, among other examples.

In some aspects, the apparatus 1800 may be configured to perform one or more operations described herein in connection with FIGS. 1-11. Additionally, or alternatively, the apparatus 1800 may be configured to perform one or more processes described herein, such as process 1400 of FIG. 14. In some aspects, the apparatus 1800 and/or one or more components shown in FIG. 18 may include one or more components of the wireless device described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the wireless device described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the wireless device described in connection with FIG. 2. In some aspects, the transmission component 1804 may be co-located with the reception component 1802 in a transceiver.

The buffer status component 1808 may generate information indicating a buffer status of the wireless device. The transmission component 1804 may transmit the information to a UE via a sidelink channel.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a user equipment (UE), comprising: receiving, from each of multiple devices that communicate with the UE via one or more sidelink channels, information indicating a buffer status of the device; and transmitting, to a base station, a buffer status report (BSR) that indicates a combined sidelink buffer status for the multiple devices.

Aspect 2: The method of Aspect 1, further comprising: receiving a combined grant for the multiple devices; and transmitting resources of the combined grant to each of the multiple devices independent of an instruction from the base station specifying an amount of the resources to grant to each of the multiple devices.

Aspect 3: The method of Aspect 1 or 2, wherein receiving the information from each of the multiple devices includes receiving the information in a sidelink medium access control control element (MAC CE).

Aspect 4: The method of any of Aspects 1-3, wherein the BSR includes a sum of the buffer statuses of the multiple devices.

Aspect 5: The method of Aspect 4, wherein the BSR indicates a difference between a total buffer size for awaiting transmissions in the buffer of the UE and an amount of data that the UE is able to handle using currently granted resources.

Aspect 6: The method of Aspect 5, wherein the difference is a negative value that indicates an amount of the currently granted resources that will not be used.

Aspect 7: The method of any of Aspects 1-6, wherein the BSR indicates a predicted amount of data that is expected to arrive at the UE from the multiple devices.

Aspect 8: The method of any of Aspects 1-7, wherein the BSR includes a combination of a sum of buffer statuses of the multiple devices and a predicted amount of data that is expected to arrive at the UE from the multiple devices.

Aspect 9: The method of Aspect 8, wherein the BSR is for a total amount of data that is to be received and to be transmitted.

Aspect 10: The method of Aspect 8 or 9, wherein the sum and the predicted amount of data are each weighted or scaled based at least in part on one or more of a predicted modulation and coding scheme for each of the multiple devices, a transmit power for each of the multiple devices, or a capability of each of the multiple devices for buffering or transmitting.

Aspect 11: The method of any of Aspects 8-10, wherein transmitting the BSR includes transmitting the BSR in a medium access control control element (MAC CE) with separate entries for the sum and for the predicted amount of data.

Aspect 12: The method of any of Aspects 8-10, wherein transmitting the BSR includes transmitting the BSR in a medium access control control element (MAC CE) with an indication that indicates whether the combined sidelink buffer status is for the sum, the predicted amount of data, both the sum and the predicted amount of data separately, or a combination of the sum and the predicted amount of data.

Aspect 13: The method of any of Aspects 8-12, wherein transmitting the BSR includes transmitting the BSR based at least in part on whether the UE is communicating to a quantity of UEs that satisfies a UE quantity threshold, the UE is a group-lead UE of a group of UEs, or the UE has a UE capability that satisfies a UE capability threshold.

Aspect 14: The method of any of Aspects 8-13, wherein transmitting the BSR includes transmitting the BSR based at least in part on receiving a scheduling request configuration from the base station.

Aspect 15: The method of any of Aspects 1-14, wherein the combined sidelink buffer status is based at least in part on one or more of channel conditions for each device or a predicted modulation and coding scheme for each device.

Aspect 16: The method of any of Aspects 1-15, wherein transmitting the BSR includes transmitting the BSR in a medium access control control element (MAC CE) that indicates a buffer size for each of multiple logical channel groups.

Aspect 17: The method of any of Aspects 1-15, wherein transmitting the BSR includes transmitting the BSR in a medium access control control element (MAC CE) that indicates a buffer size for a specified logical channel group.

Aspect 18: The method of any of Aspects 1-17, wherein the BSR applies to a specified logical channel group or to all logical channel groups.

Aspect 19: A method of wireless communication performed by a base station, comprising: receiving, from a user equipment (UE), a buffer status report (BSR) that indicates a combined sidelink buffer status for multiple devices that communicate with the UE via a sidelink channel; and transmitting, to the UE, a grant of resources that the UE is to distribute to the multiple devices, based at least in part on the BSR.

Aspect 20: The method of Aspect 19, wherein the BSR includes a sum of the buffer statuses of the multiple devices.

Aspect 21: The method of Aspect 20, wherein the BSR indicates a difference between a total buffer size for awaiting transmissions in the buffer of the UE and an amount of data that the UE is able to handle using currently granted resources.

Aspect 22: The method of any of Aspects 19-21, wherein the BSR indicates a predicted amount of data that is expected to arrive at the UE from the multiple devices.

Aspect 23: The method of any of Aspects 19-22, wherein the BSR includes a combination of a sum of buffer statuses of the multiple devices and a predicted amount of data that is expected to arrive at the UE from the multiple devices.

Aspect 24: The method of Aspect 23, wherein the sum and the predicted amount of data are each weighted or scaled based at least in part on one or more of a predicted modulation and coding scheme for each of the multiple devices, a transmit power for each of the multiple devices, or a capability of each of the multiple devices for buffering or transmitting.

Aspect 25: The method of any of Aspects 19-24, wherein receiving the BSR includes receiving the BSR based at least in part on transmitting a scheduling request (SR) configuration to the UE.

Aspect 26: The method of Aspect 25, wherein transmitting the grant of resources includes transmitting the grant of resources based at least in part on receiving an SR from the UE or based at least in part on whether a prohibit timer is running.

Aspect 27: A method of wireless communication performed by a wireless device, comprising: generating information indicating a buffer status of the wireless device; and transmitting the information to a user equipment via a sidelink channel.

Aspect 28: The method of Aspect 27, wherein transmitting the information includes transmitting the information in a medium access control control element (MAC CE).

Aspect 29: The method of Aspect 27 or 38, wherein the wireless device is a sensor or actuator.

Aspect 30: A method of wireless communication performed by a user equipment (UE), comprising: receiving, from each of multiple devices that communicate with the UE via sidelink, information indicating a buffer status of the device; and transmitting, to a base station, a request for resources that is based at least in part on a combined sidelink buffer status for the multiple devices.

Aspect 31: The method of Aspect 30, wherein the request requests resource elements or subchannels to be used within a configured report periodicity.

Aspect 32: An apparatus for wireless communication at a device, comprising a processor; memory coupled with the processor; and instructions stored in the memory and executable by the processor to cause the apparatus to perform the method of one or more of Aspects 1-31.

Aspect 33: A device for wireless communication, comprising a memory and one or more processors coupled to the memory, the one or more processors configured to perform the method of one or more of Aspects 1-31.

Aspect 34: An apparatus for wireless communication, comprising at least one means for performing the method of one or more of Aspects 1-31

Aspect 35: A non-transitory computer-readable medium storing code for wireless communication, the code comprising instructions executable by a processor to perform the method of one or more of Aspects 1-31.

Aspect 36: A non-transitory computer-readable medium storing a set of instructions for wireless communication, the set of instructions comprising one or more instructions that, when executed by one or more processors of a device, cause the device to perform the method of one or more of Aspects 1-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive, from each of multiple devices that communicate with the UE via one or more sidelink channels, information indicating a buffer status of the device; and
      transmit, to a base station, a buffer status report (BSR) that indicates a combined sidelink buffer status for the multiple devices,
      wherein the BSR is a preemptive BSR that includes an estimate of resource requirements for the multiple devices based on a predicted amount of data.

2. The UE of claim 1, wherein the one or more processors are configured to:
   receive a combined grant for the multiple devices; and
   transmit resources of the combined grant to each of the multiple devices independent of an instruction from the base station specifying an amount of the resources to grant to each of the multiple devices.

3. The UE of claim 1, wherein the one or more processors, to receive the information from each of the multiple devices, are configured to receive the information in a sidelink medium access control control element (MAC CE).

4. The UE of claim 1, wherein the BSR includes a sum of buffer statuses of the multiple devices.

5. The UE of claim 4, wherein the BSR indicates a difference between a total buffer size for awaiting transmissions in a buffer of the UE and an amount of data that the UE is able to handle using currently granted resources.

6. The UE of claim 5, wherein the difference is a negative value that indicates an amount of the currently granted resources that will not be used.

7. The UE of claim 1, wherein the predicted amount of data is expected to arrive at the UE from the multiple devices.

8. The UE of claim 1, wherein the BSR includes a combination of a sum of buffer statuses of the multiple devices and the predicted amount of data that is expected to arrive at the UE from the multiple devices.

9. The UE of claim 8, wherein the BSR is for a total amount of data that is to be received and to be transmitted.

10. The UE of claim 8, wherein the sum and the predicted amount of data are each weighted or scaled based at least in part on one or more of a predicted modulation and coding scheme for each of the multiple devices, a transmit power for each of the multiple devices, or a capability of each of the multiple devices for buffering or transmitting.

11. The UE of claim 8, wherein the one or more processors, to transmit the BSR, are configured to transmit the BSR in a medium access control control element (MAC CE) with separate entries for the sum and for the predicted amount of data.

12. The UE of claim 8, wherein the one or more processors, to transmit the BSR, are configured to transmit the BSR in a medium access control control element (MAC CE) with an indication that indicates whether the combined sidelink buffer status is for the sum, the predicted amount of data, both the sum and the predicted amount of data separately, or a combination of the sum and the predicted amount of data.

13. The UE of claim 8, wherein the one or more processors, to transmit the BSR, are configured to transmit the BSR based at least in part on whether the UE is communicating to a quantity of UEs that satisfies a UE quantity threshold, the UE is a group-lead UE of a group of UEs, or the UE has a UE capability that satisfies a UE capability threshold.

14. The UE of claim 8, wherein the one or more processors, to transmit the BSR, are configured to transmit the BSR based at least in part on receiving a scheduling request configuration from the base station.

15. The UE of claim 1, wherein the combined sidelink buffer status is based at least in part on one or more of channel conditions for each device or a predicted modulation and coding scheme for each device.

16. The UE of claim 1, wherein the one or more processors, to transmit the BSR, are configured to transmit the BSR in a medium access control control element (MAC CE) that indicates a buffer size for each of multiple logical channel groups.

17. The UE of claim 1, wherein the one or more processors, to transmit the BSR, are configured to transmit the BSR in a medium access control control element (MAC CE) that indicates a buffer size for a specified logical channel group.

18. The UE of claim 1, wherein the BSR applies to a specified logical channel group or to all logical channel groups.

19. A base station for wireless communication, comprising:
a memory; and
one or more processors, coupled to the memory, configured to:
receive, from a user equipment (UE), a buffer status report (BSR) that indicates a combined sidelink buffer status for multiple devices that communicate with the UE via a sidelink channel,
wherein the BSR is a preemptive BSR that includes an estimate of resource requirements for the multiple devices based on a predicted amount of data; and
transmit, to the UE, a grant of resources that the UE is to distribute to the multiple devices, based at least in part on the BSR.

20. The base station of claim 19, wherein the BSR includes a sum of buffer statuses of the multiple devices.

21. The base station of claim 20, wherein the BSR indicates a difference between a total buffer size for awaiting transmissions in a buffer of the UE and an amount of data that the UE is able to handle using currently granted resources.

22. The base station of claim 19, wherein the predicted amount of data is expected to arrive at the UE from the multiple devices.

23. The base station of claim 19, wherein the BSR includes a combination of a sum of buffer statuses of the multiple devices and the predicted amount of data that is expected to arrive at the UE from the multiple devices.

24. The base station of claim 23, wherein the sum and the predicted amount of data are each weighted or scaled based at least in part on one or more of a predicted modulation and coding scheme for each of the multiple devices, a transmit power for each of the multiple devices, or a capability of each of the multiple devices for buffering or transmitting.

25. The base station of claim 19, wherein the one or more processors, to receive the BSR, are configured to receive the BSR based at least in part on transmitting a scheduling request (SR) configuration to the UE.

26. The base station of claim 25, wherein the one or more processors, to transmit the grant of resources, are configured to transmit the grant of resources based at least in part on receiving the SR from the UE or based at least in part on whether a prohibit timer is running.

27. A method of wireless communication performed by a user equipment (UE), comprising:
receiving, from each of multiple devices that communicate with the UE via one or more sidelink channels, information indicating a buffer status of the device; and
transmitting, to a base station, a buffer status report (BSR) that indicates a combined sidelink buffer status for the multiple devices,
wherein the BSR is a preemptive BSR that includes an estimate of resource requirements for the multiple devices based on a predicted amount of data.

28. The method of claim 27, further comprising:
receiving, from the base station, a combined grant for the multiple devices; and
transmitting resources of the combined grant to each of the multiple devices independent of an instruction from the base station specifying an amount of the resources to grant to each of the multiple devices.

29. The method of claim 27, wherein receiving the information includes receiving the information in a sidelink medium access control control element (MAC CE).

30. A method of wireless communication performed by a base station, comprising:
receiving, from a user equipment (UE), a buffer status report (BSR) that indicates a combined sidelink buffer status for multiple devices that communicate with the UE via a sidelink channel,
wherein the BSR is a preemptive BSR that includes an estimate of resource requirements for the multiple devices based on a predicted amount of data; and
transmitting, to the UE, a grant of resources that the UE is to distribute to the multiple devices, based at least in part on the BSR.

* * * * *